United States Patent
Bao et al.

[19]

[11] Patent Number: 5,892,582
[45] Date of Patent: Apr. 6, 1999

[54] FABRY PEROT/FIBER BRAGG GRATING MULTI-WAVELENGTH REFERENCE

[75] Inventors: Yufei Bao, Roswell; David Daugherty, Lawrenceville; Kevin Hsu, Roswell, all of Ga.; Tom Q. Y. Li, San Jose, Calif.; Calvin M. Miller, Naples, Fla.; Jeffrey W. Miller, Kennesaw, Ga.

[73] Assignee: Micron Optics, Inc., Atlanta, Ga.

[21] Appl. No.: 897,474

[22] Filed: Jul. 21, 1997

Related U.S. Application Data

[60] Provisional application No. 60/012,517, Oct. 18, 1996 and provisional application No. 60/031,562, Dec. 3, 1996.

[51] Int. Cl.[6] ................................................. G01B 9/02
[52] U.S. Cl. ................. 356/345; 356/352; 250/227.27
[58] Field of Search ..................................... 356/346, 352, 356/345; 250/227.19, 227.27; 385/12, 14

[56] References Cited

U.S. PATENT DOCUMENTS

| | | |
|---|---|---|
| 4,848,999 | 7/1989 | Taylor . |
| 4,892,388 | 1/1990 | Taylor . |
| 4,923,273 | 5/1990 | Taylor . |
| 4,996,419 | 2/1991 | Morey . |
| 5,042,898 | 8/1991 | Morey et al. . |
| 5,062,684 | 11/1991 | Clayton et al. . |
| 5,073,004 | 12/1991 | Clayton et al. . |
| 5,212,745 | 5/1993 | Miller . |
| 5,212,746 | 5/1993 | Miller et al. . |
| 5,289,552 | 2/1994 | Miller et al. . |
| 5,361,130 | 11/1994 | Kersey et al. . |
| 5,375,181 | 12/1994 | Miller et al. . |
| 5,380,995 | 1/1995 | Udd et al. . |
| 5,397,891 | 3/1995 | Udd et al. . |
| 5,401,956 | 3/1995 | Dunphy et al. . |
| 5,410,404 | 4/1995 | Kersey et al. . |
| 5,422,970 | 6/1995 | Miller et al. . |
| 5,425,039 | 6/1995 | Hsu et al. . |
| 5,426,297 | 6/1995 | Dunphy et al. . |
| 5,509,093 | 4/1996 | Miller et al. . |
| 5,513,913 | 5/1996 | Ball et al. . |
| 5,563,973 | 10/1996 | Miller et al. . |
| 5,591,965 | 1/1997 | Udd . |
| 5,682,237 | 10/1997 | Belk ........................................ 356/352 |

OTHER PUBLICATIONS

Arya, V. et al. "Temperature Compensation Scheme for Refractive Index Grating–Based Optical Fiber Devices," SPIE 2594:52–59.

Boucher, R. et al. (1992), "Calibrated Fabry–Perot etalon as an absolute frequency reference for OFDM communications," IEEE Photonics Technol. Lett. 4:801–803.

Foote, P.D. (1994), "Fibre Bragg Grating Stain Sensors for Aerospace Smart Structures," Second European Conf. on Smart Structures and Materials, Glasgow, U.K., session 8, p. 290.

Friebele, E.J. et al. (1994), "Fiberoptic Sensors measure up for smart structures," Laser Focus World, (May), pp. 165–169.

(List continued on next page.)

*Primary Examiner*—Samuel A. Turner
*Attorney, Agent, or Firm*—Greenlee, Winner and Sullivan, PC

[57] ABSTRACT

A multi-wavelength reference for use in identifying and measuring wave-lengths of radiation from an optical device. The invention provides an interferometer to generate a comb of accurately spaced peaks spanning a selected wavelength range combined with a fiber Bragg grating (FBG) of known Bragg wavelength to generate a peak or notch of known wavelength for use in identifying or marking a peak of the comb. The combination provides an accurate multi-wavelength reference useful in particular with high resolution wavelength scanners, such as tunable FFPI. The invention further provides systems for controlling, and/or compensating for, relative shifts in the wavelengths of the interferometer and the FBG as a function of changing temperature.

20 Claims, 14 Drawing Sheets

OTHER PUBLICATIONS

Gamache, C. et al. (1996), "An optical frequency scale in exact multiples of 10GHz for standardization of multifrequency communications," IEEE Photonics Technol. Lett. 8:290–292.

Glance, B.S. et al. (1988), "Densely spaced FDM coherent star network with optical signals confined to equally spaced frequencies," IEEE J. Lightwave Technol. LT–6:1770–1781.

Kersey, A.D. et al. (1993), "Multiplexed fiber Bragg strain–sensor system with a fber Fabry–Perot wavelength filter," Opt. Lett. 18:1370–1372.

Kersey, A.D. et al. (1995), "Development of Fiber Sensors for Structural Monitoring," SPIE 2456:262–268.

Kersey, A.D. (1996), "Interrogation and Multiplexing Techniques for Fiber Bragg Grating Strain–Sensors," Optical Sciences Division, Naval Research Laboratory (NRL) code 5674, distributed by NRL at SPIE Meeting, Fall 1996, (Denver, CO).

Martin, J. et al. (1997), "Use of a ssampled Bragg grating as an in–fiber optical resonator for the realization of a reference optical frequency sale for WDM communications," Optical Fiber Communications Conference OFC–97, Technical Digest, paper ThI5, pp. 284–285.

Rao, Y–J. and Jackson, D.A. (1996), "Universal Fiber–Optic Point Sensor System for Quasi–Static Absolute Measurements for Multiparameters Exploiting Low Coherence Interrogation," J. Lightwave Technol. 14(4):592–600.

Rao, Y–J. (1996), "Strain sensing of modern composite materials with a spatial–wavelength–division multiplexed fiber grating network," Opt. Lett. 21(9):683–685.

Sakai, T. et al. (1992), "Frequency stabilization of laser diodes using 1.51–1.55 $\mu$m absorption lines of $^{12}C_2H_2$ and $^{13}C_2H_2$," IEEE J. Quant. Electron. 28:75–81.

Stone, J. and Marcuse, D. (1986), "Ultrahigh finesse fiber Fabry–Perot interferometers," IEEE J. Lightwave Technol. LT–4:382–385.

Yoffe, G.W. et al. (1995), "Passive temperature–compensating package for optical fiber gratings," Appl. Opt. 34(30):68596861.

FABRY PEROT/FIBER BRAGG GRATING MULTI-WAVELENGTH REFERENCE

CROSS-REFERENCE TO RELATED APPLICATIONS

This application takes priority under 35 USC § 119 (e) to U.S. provisional applications Ser. No. 60/028,517 filed Oct. 18, 1996 and Ser. No. 60/031,562 filed Dec. 3, 1996, and U.S. patent application Ser. No. 08/833,602 filed Apr. 9, 1997, all of which are incorporated in their entirety by reference herein.

FIELD OF THE INVENTION

This invention relates generally to devices and methods for the measurement of wavelengths of light and more particularly to accurate wavelength references utilizing interferometers and in-fiber Bragg gratings (FBGs). The invention relates in particular to wavelength references which combine a fiber Fabry-Perot interferometer (FFPIs) with and FBG. The invention provides multi-wavelength references, devices, e.g. wavemeters and wavelength interrogators, employing the multi-wavelength references, and methods of detecting light of a given wavelength, methods of measuring wavelength and differences in wavelength with devices having the wavelength reference.

BACKGROUND OF THE INVENTION

Lensed Fabry-Perot interferometers (FPIs) have provided seminal optical spectrum measurements in physics, chemistry, astronomy and other diverse scientific fields for more than a century. Miniature lensed FPIs adapted to fiber optical systems with optical fiber pigtails can provide medium resolution tuning (finesse=100). Lensless fiber Fabry-Perot interferometers (FFPIs), however, can perform at resolutions>500 for tuning functions in optical fiber systems. These high performance tunable FFPIs (also called fiber Fabry-Perot tunable filters(FFP-TFs) have made interrogator systems for accurately measuring wavelength response of passive or active fiber optics devices possible.

In wavelength sensing applications over a wide wavelength range, the high resolution of tunable FFPIs provides a distinct advantage and allows sensing to picometer levels. In addition, the all-fiber, lensless FFPI is mechanically robust with a reliability record in the field of less than 300 FITS (failure interval times) and, when appropriately temperature compensated, operates from −20° C. to +80° C. with minimal insertion loss and tuning voltage variation.

All-fiber lensless FFPIs used as scanning interferometers can sense extremely small wavelength shifts when piezoelectric actuators (PZTs) are used for tuning the multipass dual mirror optical cavity. However, early work using these interferometers for measuring wavelength shifts in reflected FBGs lacked adequate wavelength references for long-term stability. See: A. D. Kersey et al. (1993) supra ; E. J. Friebele et al. (1994) supra; A. D. Kersey et al. (1995) supra; A. D. Kersey (1996) supra.

The PZT piezoelectric actuator typically employed to tune FPIs exhibits dynamic nonlinearities arising from nonlinear length dependence on voltage, and voltage hysteresis with temperature. Therefore, to fully utilize a tunable FPI (whether a lensed or all-fiber FPI) as a spectrally calibrated interferometer, certain real-time multi-wavelength referencing techniques should be implemented. Among various absolute wavelength references, molecular absorption lines of $^{12}C_2H_2$ and $^{13}C_2H_2$ acetylene (Sakai, T. et al. (1992), "Frequency stabilization of laser diodes using 1.51–1.55 $\mu$m absorption lines of $^{12}C_2H_2$ and $^{13}C_2H_2$," IEEE J. Quantum Electron. 28:75–81) seem to offer potential media for multi-wavelength referencing. However, their unevenly spaced absorption lines and absorptive operation render them difficult for tunable FPI-based spectral applications. FPIs with narrowly-spaced uniform transmission peaks (e.g. ~100 GHz) have often been considered for absolute frequency reference when locked to atomic or molecular absorption lines (Glance, B. S. et al. (1988), "Densely spaced FDM coherent star network with optical signals confined to equally spaced frequencies," IEEE J. Lightwave Technol. LT-6:1770–1781; Boucher, R. et al. (1992), "Calibrated Fabry-Perot etalon as an absolute frequency reference for OFDM communications," IEEE Photonics Technol. Lett. 4:801–803; Gamache, C. et al. (1996), "An optical frequency scale in exact multiples of 100 GHz for standardization of multifrequency communications," IEEE Photonics Technol. Lett. 8:290–292). While this is appropriate for stabilizing laser arrays, it is restricted in wavelength positioning and requires active feedback control. Sampled fiber Bragg gratings (FBGs) have recently been reported to exhibit uniform optical frequency scale of 100 GHz spacing useful for WDM applications (Martin, J. et al. (1997), "Use of a sampled Bragg grating as an in-fiber optical resonator for the realization of a referencing optical frequency scale for WDM communications," Optical Fiber Communication Conf. OFC-97, Technical Digest, paper ThI5, pp. 284–285). However, their narrow overall wavelength span poses a limitation.

In-Fiber Bragg gratings (FBGs) can produce a narrow-band response around a single wavelength (reflecting a narrow-band peak or transmitting the illuminating spectrum with a narrow-band notch or hole). The dopants used to increase the index of refraction in the cores of optical fibers are photosensitive and by exposing a single-mode fiber to interfering beams of UV light, or through a suitable mask, a diffraction pattern can be written into the core that reflects a single narrow-band wavelength of light. The resulting fiber Bragg grating (FBG) transmits all other wavelengths carried by the single-mode fiber and reflects almost all (up to 99.9%) of the light that meets the Bragg condition (i.e., the Bragg reflection wavelength $\lambda_B$=2ns, where s is the grating pitch and n is the effective index of the fiber core).

FBGs have been employed in fiber optic sensors in a variety of sensing application, including for strain and temperature measurements. See, for example, U.S. Pat. No. 4,996,419 (Morey) issued Feb. 26, 1991; U.S. Pat. No. 5,380,995 (Udd et al.) issued Jan. 10, 1995; U.S. Pat. No. 5,397,891 (Udd et al.) issued Mar. 14, 1995; U.S. Pat. No. 5,401,956 (Dunphy and Falkowich) issued Mar. 28, 1995; U.S. Pat. No. 5,410,404 (Kersey et al. ) issued Apr. 25, 1995; U.S. Pat. No. 5,426,297 (Dunphy and Falkowich) issued Jun. 20, 1995; U.S. Pat. No. 5,591,965 (Udd) issued Jan. 7, 1997. See also, for example, FBG sensor applications in: (embedded FBGs) P. D. Foote (1994) "Fibre Bragg Grating Strain Sensors for Aerospace Smart Structures" Presented at the Second European Conf. on Smart Structures and Materials, Glasgow, U.K., session 8, p. 290 and references therein. Multiparameter environmental sensors can be formed using dual overwritten FBGs as described in U.S. Pat. No. 5,591,965. FBGs can be employed to form in-fiber lasers which can be used for sensing applications as described in U.S. Pat. No. 5,513,913 (Ball et al.) issued May 7, 1996. These sensing techniques depend on the ability to accurately measure the wavelengths of light reflected or transmitted by FBG sensors. A number of sensing system configurations have been developed. See, for example, U.S. Pat. No. 5,361,30 (Kersey et al.) issued Nov. 1, 1994 and U.S. Pat. No. 5,410,404 (Kersey et al.) issued Apr. 25, 1995; A. D. Kersey et al. (1993) "Multiplexed fiber Bragg grating strain-sensor system with a fiber Fabry-Perot wavelength filter." Optics Letters 18(16):1370; E. J. Friebele et al. (1994) "Fiberoptic Sensors measure up for smart structures" Laser Focus World (May) pp. 165–169; A. D. Kersey et al. (1995) "Development of Fiber Sensors for Structural Monitoring" SPIE 2456:262–268 (0-8194-1809-9/95); A. D. Kersey (1996) "Interrogation and Multiplexing Techniques for Fiber Bragg Grating Strain-Sensors" Optical Sciences Division Naval Research Laboratory (NRL) code 5674 distributed by NRL at SPIE Meeting Fall 1996 (Denver, Colo.); U.S. Pat. No. 5,426,297 (J. R. Dunphy et al.) issued Jun. 20, 1995; Y-J. Rao and D. A. Jackson (1996) "Universal Fiber-Optic Point Sensor System for Quasi-Static Absolute Measurements of Multiparameters Exploiting Low Coherence Interrogation" J. Lightwave Techno. 14(4):592–600; Y-J. Rao et al. (1996) "Strain sensing of modern composite materials with a spatial/wavelengthdivision multiplexed fiber grating network" Optics Letters 21(9):683–685; and references cited therein. FFPIs and other fiber-based interferometers can also be used as sensing elements in environmental sensor, for example for temperature and strain sensing. Typically, an environmental(e.g.,temperature or strain) change induces a change in the length of the filter cavity which is exhibited as a shift in filter wavelengths.

Low resolution (finesse) fixed FPIs (lensed or all-fiber lensless) can be used as accurate wavelength references for the calibration of tunable FFPIs (e.g., FFP-TFs) to increase both accuracy, and long-term stability of wavelength measurements. Although FPIs produce multiple, very accurately spaced, wavelengths (i.e., a comb of peaks), a consistent problem with their use as wavelength references has been the need to accurately identify a given individual peak among the multiple wavelength peaks produced. Hence, in the application of fixed-cavity FPIs as wavelength references, a means for identifying the particular teeth in comb of the FPI output peaks is needed.

This invention provides a wavelength reference system which overcomes the difficulties encountered in the use of such interferometers, particularly in the use of fixed-cavity FPIs, as references in wavelength detection and measuring devices.

Fixed and tunable FFPIs are described in U.S. Pat. Nos. 5,062,684, 5,073,004, 5,212,745; 5,212,746; 5,289,552; 5,375,181; 5,422,970; 5,509,093 and 5,563,973, all of which are incorporated by reference in their entireties herein, particularly for their disclosure of the structures and operation of these filters.

SUMMARY OF THE INVENTION

An object of the invention is to provide an accurate and robust multi-wavelength interferometer-based reference for use in wavelength detection and measurement. A further object of the invention is a wavelength reference the accuracy of which is minimally affected by changes in temperature over a wide range of device operating temperatures. A particular object of this invention is an accurate wavelength reference for use in fiber optic sensor interrogation systems. Another specific object of this invention is an accurate wavelength reference for use with scanning interferometers, particularly for tunable all-fiber Fabry-Perot interferometers (tunable-FFPIs). Yet another object of this invention is a multi-wavelength reference capable of achieving wavelength calibration accuracy of tunable-FFPIs to the picometer (pm) level. These objects and others that will be apparent from the following descriptions are met by devices, device configurations and methods provided herein.

The present invention provides an interferometer filter combined with a fiber Bragg grating (FBG) for use as a multi-wavelength reference in measuring or identifying wavelengths of radiation emitted or reflected by optical devices. In general any interferometer that is suitable for use in a fiber optic system can be used in combination with an FBG to provide the inventive multi-wavelength reference. Preferred wavelength references combine a Fabry-Perot interferometer (FPI) with an FBG. More preferred wavelength references combine a fixed-cavity fiber Fabry-Perot interferometer (fixed-cavity FFPI) with an FBG. The FFPI can be an all-fiber FFPI or a lensed FFPI.

The interferometer provides a relatively large number of very accurately spaced wavelengths (hereinafter referred to as a comb). In the present invention, the FBG output which is detectable as a peak or notch in wavelength is used as a marker wavelength to identify the wavelength of a peak in the comb produced by the interferometer. The various embodiments of the invention include both series and parallel combinations of interferometers and FBGs useful as multi-wavelength references.

The wavelength of and the spacing between, the peaks of the comb generated by the interferometer can be determined by accurate wavelength calibration at a given temperature (calibration temperature). However, after calibration, identifying a particular peak as having a given wavelength among the many closely spaced teeth of the comb of peaks can be extremely difficult. Therefore, the FBG is used to provide a known wavelength peak, or notch, for use as a marker to positively identify (or tag) one of the peaks from the comb as that having a given wavelength. Since the wavelength spacing of the comb peaks is accurately known, the wavelengths of all peaks in the comb are uniquely identifiable once one peak is associated with a given wavelength. The FBG is selected such that its Bragg wavelength falls within the wavelength range of the comb generated by the interferometer. Preferably, the FBG is selected such that its Bragg wavelength substantially coincides with a wavelength in the comb generated by the interferometer and hence can be used to identify the peak in the comb which has that comb wavelength.

In a series configuration of an interferometer and an FBG, the wavelength of the FBG transmission notch can be selected to substantially coincide with a wavelength generated by the interferometer and thereby diminish the magnitude of the peak of that wavelength when the output of the FBG and the interferometer are superimposed. In a parallel combination, an FBG reflection peak, or alternatively an FBG transmission notch, can be selected to substantially coincide with a wavelength generated by the interferometer and thereby diminish or enhance, respectively, the magnitude of the comb peak of that wavelength when the output of the FBG and the interferometer are superimposed, for example, by use of an optical spitter. When used in a sensor interrogator or multi-wavelength measurement system employing a wavelength scanner, outputs of the interferometer and the FBG (reflection or transmission output)can be individually captured on different scans, e.g. alternate scans, and the superposition of outputs synthesized by time multiplexing. In this case, the FBG wavelength can be selected to lie between two comb wavelengths and still uniquely identify a comb peak as that having the comb wavelength preceding or following that of the wavelength of the FBG.

Differences in the temperature coefficients of expansion between the interferometer and the FBG can cause the FBG peak to shift with temperature relative to the peaks of the comb which may cause misidentification of the teeth in the comb at temperatures different than the temperature at which wavelength calibration is performed. This invention provides several embodiments that control differential temperature effects in the components of the multi-wavelength reference and provide for improved accuracy over a wider range of device operating temperatures.

For example, the accuracy of the wavelengths of the multi-wavelength reference can be improved by enclosing the interferometer and the FBG in a thermally insulated environment. Alternatively, the interferometer and the FBG can be temperature compensated to decrease the magnitude of their temperature coefficients.

In a more preferred embodiment, the interferometer, and FBG are enclosed with a temperature sensor in a thermally conductive assembly to ensure that the interferometer and the FBG are at the same known temperature. In this case, the comb wavelengths can be calculated by using a predetermined temperature coefficient algorithm and the measured temperature of the reference to compute the derivations from the comb wavelengths at the calibration temperature. This calculation can be done automatically using the algorithm and a signal from the temperature sensor in the conductive assembly. Alternatively, the thermally conductive assembly of the wavelength reference can be thermally coupled through a heat transfer device to an effectively isothermal mass. A control unit can be provided which utilizes a signal from the temperature sensor to control the heat transfer device and to maintain the assembly within specific temperature limits thereby minimizing drift in the wavelengths of the fixed FPI with changes in ambient temperature.

In preferred embodiments of the invention, the interferometer is a fiber Fabry-Perot interferometer (FFPI). In more preferred embodiments the FFPI of the multi-wavelength reference is a all-fiber fixed-cavity FFPI which comprises a bonded ferrule assembly, having an optical cavity along a length of optical fiber contained within the ferrule assembly. As described above and in more detail below, the fixed-cavity FFPI can be combined with an FBG in a series or parallel configuration to construct the multi-wavelength reference.

The ferrule assembly of the FFPI is an axial arrangement comprising two cylindrical fiber ferrule elements and a fiber wafer waveguide element interposed between the ferrule elements. Each of these elements has a substantially axial bore for receiving an optical fiber. In a ferrule, an optical fiber is installed in the bore with one end flush with one end-face of the ferrule. In a wafer, an optical fiber is installed in the bore, with each end of the fiber flush with each end-face of the wafer, and preferably the ends of the fiber in the wafer are mirror coated. The fiber in the wafer is axially aligned with the fibers in the ferrules and the end-faces of the ferrules are bonded to the end-faces of the wafer. The optical cavity of this FFPI is formed by the fiber in the wafer and its two mirror coated ends. Alternatively the ends of the fibers in the ferrules can be mirror coated instead of the ends of the fiber in the wafer.

In a particular preferred embodiment, the multi-wavelength reference is a fixed-cavity FFPI comprising a bonded ferrule assembly, having an optical cavity along a length of optical fiber contained within the ferrule assembly wherein the FBG is integrated within the ferrule assembly.

In FBG-integrated FFPIs, the fiber contained in the ferrule assembly contains the FBG. The integrated FBG can be positioned inside the FFPI cavity (intracavity FBG) or more preferably outside of the FFPI cavity In either case, the FBG is combined with the FFPI in a series configuration.

By providing an FBG within the fiber of a ferrule of an FFPI, the temperature coefficients of the FFPI and the FBG are found to be sufficiently similar so that the FBG wavelength remains sufficiently close in wavelength to a particular tooth of the FFPI wavelength comb to ensure correct identification of the comb peaks over a useful, wide temperature range for operation of the reference.

The wavelength reference of this invention can be combined with a variety of tunable filters to determine wavelengths reflected or transmitted by FBG sensors or wavelengths generated, emitted or reflected by other optical device elements, wavelength sources or multi-wavelength communication systems. Wavelength references having fixed-cavity FPIs or FFPIs are particularly useful as references for use with tunable FFPIs.

DESCRIPTION OF THE PREFERRED EMBODIMENTS OF THE INVENTION

Figure 1:
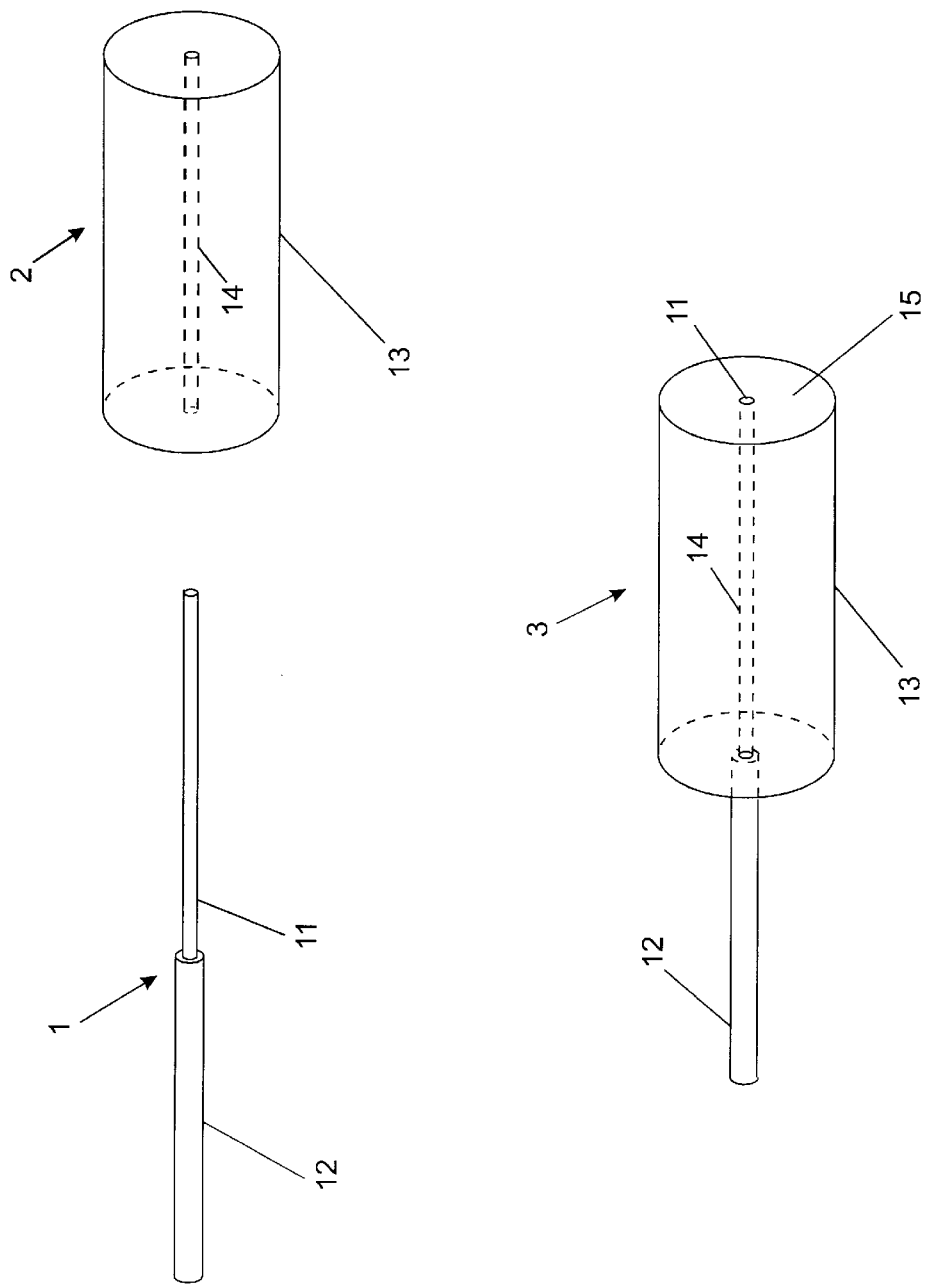
FIG. 1 is diagram showing a prior art optical fiber and ferrule.

As commonly used and used herein, in addition to its literal definition, the term wavelength is used in context to mean radiation, or a peak or notch in radiation intensity, at a particular wavelength (e.g., "the device produces a wavelength of 1510 nm"). The term "resonant wavelength" refers to the wavelength at which a peak occurs in the output of an FPI. The term "Bragg wavelength" refers to the wavelength at which a peak or notch occurs in the reflected or transmitted spectral output, respectively, of an FBG. Also, as used herein, the terms light and illumination are not limited to visible light but also include electromagnetic radiation in the infrared and ultraviolet spectra. These terms as employed are particularly directed to light that can be transmitted in optical fiber. Similarly, the term "optical" as used herein is not intended only to refer to visible light, but to electromagnetic radiation of any wavelength (including infrared and ultraviolet wavelengths) that can be transmitted in fibers. The specification refers throughout to wavelength identification and measurement. Those of ordinary skill in the art will appreciate that the frequency of light is inversely related its wavelength and that the frequency of a given light peak can be calculated once its wavelength is known. Thus, the reference devices of this invention can be used in the identification and measurement of light frequency as well as wavelength.

In the drawings, like reference numerals indicate like features; and, a reference numeral appearing in more than one figure refers to the same element. The drawings are not drawn to scale. The drawings and the following detailed descriptions show specific embodiments of the invention. Numerous specific details including materials, dimensions, and products are provided to illustrate the invention and to provide a more thorough understanding of the invention. However, it will be obvious to one skilled in the art that the present invention may be practiced without these specific details.

FIG. 1 is a diagram showing an optical fiber and glass ferrule of the prior art. Optical fiber 1 comprises bare fiber outer diameter 11 which contains the fiber core and coating 12. Ferrule cylinder 2 comprises a cylinder 13 having a bore 14. Ferrule 3 is formed by inserting and bonding outer diameter 11 of fiber 1 into bore 14 of ferrule cylinder 2. Fiber 1 is preferably single-mode optical fiber. Typically, fiber 1 has an bare fiber outer diameter 11 of about 125 microns and a coating 12 diameter of about 250 microns; A single-mode fiber core is typically about 10 μm in diameter. Ferrule cylinder 2 typically has an outside diameter of about 250 microns, an inside diameter of about 127 microns, and a length of a several centimeters. Preferably cylinder 13 is made of pyrex, glass, ceramic or glass-ceramic material. Face 15 of ferrule 3 is finished to provide a flat smooth surface across face 15 and the exposed end of the 11. Face 15 preferably is substantially perpendicular to bare fiber 11 and the axis of ferrule 3.

Figure 2:
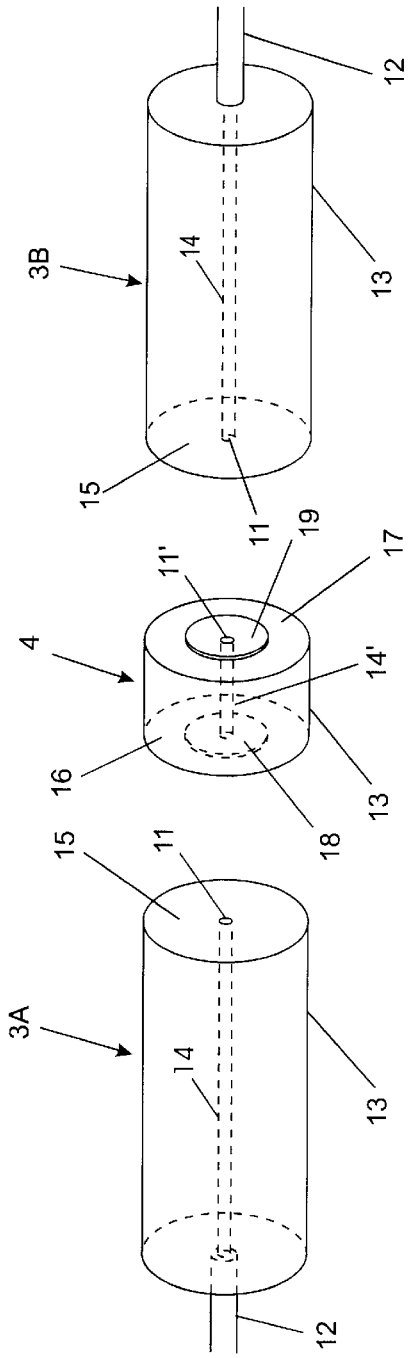
FIG. 2 illustrates the ferrule assembly components of an exemplary FFPI.

FIG. 2 is a diagram showing the components comprising a ferrule-based fixed-cavity FFPI of the invention. The components include first and second ferrules 3A and 3B each as described in FIG. 1. Wafer 4 comprises a cylindrical ferrule portion having a bare fiber 11' in its axial wafer bore 14', first and second finished faces 16 and 17, and mirror coatings 18 and 19 applied to portions of faces 16 and 17 and corresponding ends of fiber 11' at those faces. Alternatively, the mirror coatings can be applied to face 15, and the corresponding end of fiber 11, of either or both of ferrules 3A and 3B instead of faces 16 and 17. Wafer 4 preferably has a length ranging from 200 to 2000 microns, depending on the design wavelength, although a much greater range can be used for spectroscopy.

Figure 3:
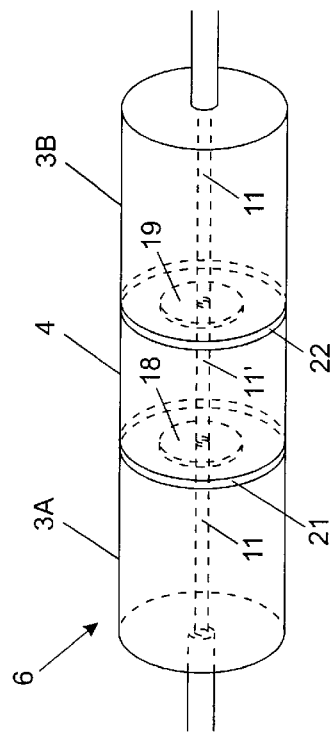
FIG. 3 illustrates an exemplary FFPI of the invention.

To form a fixed-cavity FFPI 6 as shown in FIG. 3, faces 15 of ferrules 3A and 3B are bonded to faces 16 and 17 of wafer 4 with first and second adhesive layers 21 and 22, respectively, while maintaining coaxial alignment of fibers 11 and 11'. The preferred adhesive is UV-cured epoxy.

Figure 4A:
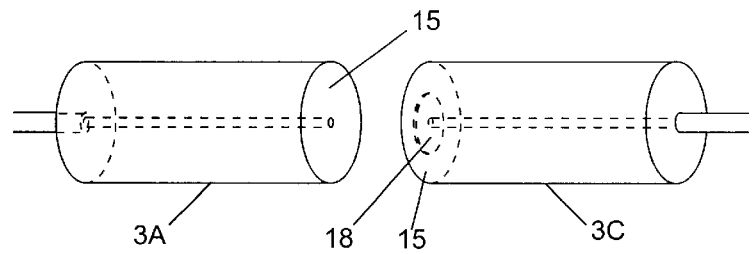
FIGS. 4A–4D show the steps of making an exemplary FFPI of the invention.
Figure 4B:
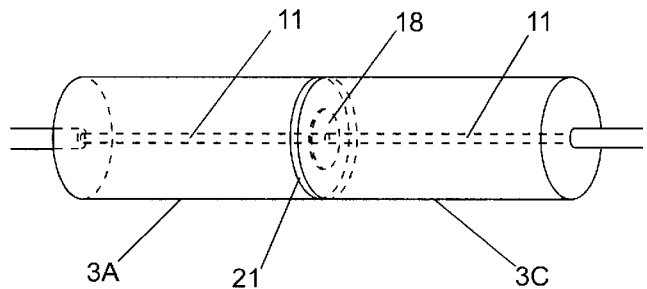
Figure 4C:
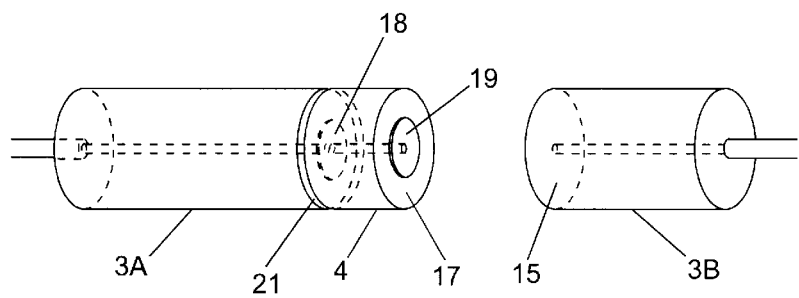
Figure 4D:
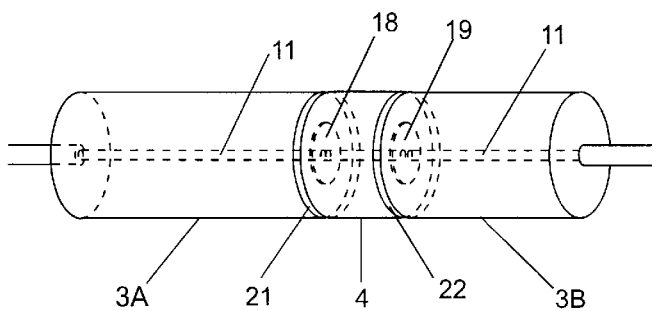

A preferred method of making a fixed FFPI is shown in FIGS. 4A–4D. In this method, the process begins with first and second ferrules 3A and 3C, as shown in FIG. 4A, each having a finished face 15. A mirror coating 18 is applied to a portion of face 15 of ferrule 3B. Face 15 of ferrule 3C is bonded to face 15 of ferrule 3A with adhesive layer 21 as shown in FIG. 4B (face 15 of ferrule 3B then becomes functionally face 16 of FIG. 2). During the bonding process, coaxial alignment of bare fibers 11 is obtained by maximizing light transmission through the fibers. Then, as shown in FIG. 4C, ferrule 3C is cut and/or ground, to produce wafer 4, resulting in face 17 on wafer 4. A mirror coating 19 is applied to a portion of face 17. A third ferule 3B with finished face 15 is provided and then face 15 of ferrule 3B is bonded to face 17 of wafer 4, while maintaining coaxial alignment of fibers 11, with adhesive layer 22 as shown in FIG. 4D to provide the fixed-cavity length FFPI. The truncated portion of ferrule 3C remaining after wafer 4 is formed can also be used as the third ferrule. The FP cavity extends between the reflective surfaces 18 and 19. In this construction, the adhesive layers are external to the FP cavity.

Alternatively, the mirror coating can be applied to face 15 of ferrule 3A and/or to face 15 of ferrule 3C during filter construction. In this design, one or both adhesive layers are within the FP cavity. Preferably, the adhesive is placed on faces 15, 16 and 17 outside the perimeter of mirror coatings 18 and 19 for better adhesion and better optical properties of the filter. Also, the thickness of the mirror coating helps to ensure a uniform thickness of the adhesive layer. The preferred adhesive is ultra-violet cured optical quality epoxy.

Methods for making fiber ferrule FPI assemblies, and in particular methods for making wafered fiber ferrules are disclosed in U.S. Pat. Nos. 5,212,745; 5,289,552; 5,212,746; 5,425,039; 5,073,044; 5,062,68; 5,509,093; 5,563,973; 5,422,970; and 5,375,181. Details of mirror deposition, adhesive bonding, and ferrule face finishing are described therein. Ferrule alignment techniques are also described therein. Automated fiber ferrule alignment systems are now commercially available and can be used in ferrule assembly construction of fixed-cavity FFPIs. Systems employing v-groove ferrule holders to automatically align fibers of ferrules in the x and y directions to maximize light transmission through the fibers are available, for example, from Melles-Griot. In a preferred construction method, the alignment and bonding steps of FIGS. 4A–4D are performed using an automated alignment device.

Ferrule-based FFPI typically employ reflective surfaces, for example $SiO_2$ or $TiO_2/SiO_2$ layers, deposited at fiber ends to form the FP cavity. In general, any method for adhering or deposition a reflective surface or mirror at a fiber end can be employed in the construction of FFPIs.

Figure 5A:
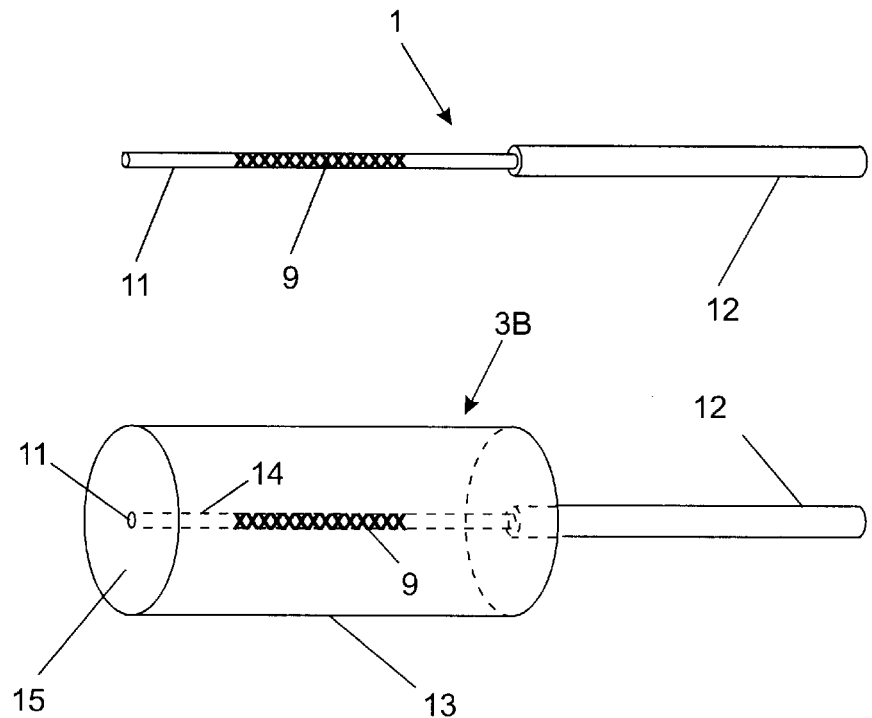
FIGS. 5A and 5B show fiber ferrules having a FBG in the fiber core within the ferrule. The FBG in the ferrule of FIG. 5A is approximately centered within the ferrule. This ferrule is typically employed to construct an FFPI of FIG. 6. The FBG in the ferrule of FIG. 5B is shifted toward an end face of the ferrule and is used to generate the FBG-containing wafer of FIG. 7.
Figure 5B:
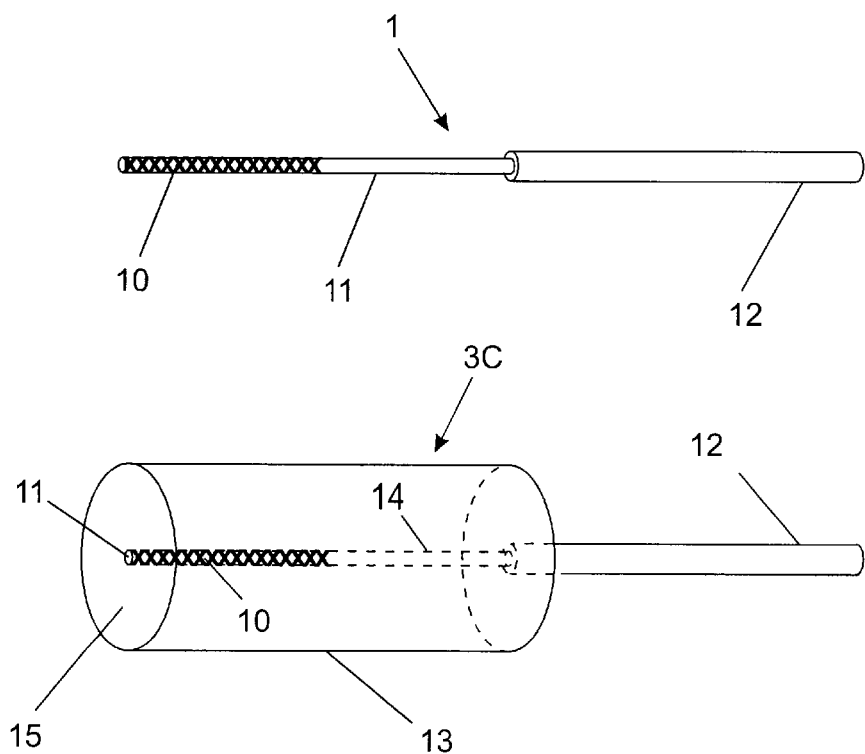

FIGS. 5A and 5B are diagrams showing optical fiber 1 and ferrule 3 as in FIG. 1 having FBG 9 (shown as cross-hatching in the bare fiber) formed in the fiber core, centrally positioned along the ferrule length or positioned starting at a ferrule end face, respectively. A typical single-mode fiber core is less than 10 μm in diameter; the FBG 9 is however, illustrated for simplicity as extending across the entire bare fiber diameter. The ferrule of FIG. 5A is used to construct an integrated FFPI/FBG of FIG. 6 with an integral FBG that is within the ferrule, but not within the FP cavity. The fiber ferrule of FIG. 5A is substituted for ferrule 3A or 3B in the construction steps of FIG. 4A–D. Commercially available FBGs typically extend about 10 millimeters along the length of a fiber core to provide 97% reflectivity at the Bragg wavelength. The ferrule of FIG. 5A preferably contains a full-length FBG.

Figure 7:
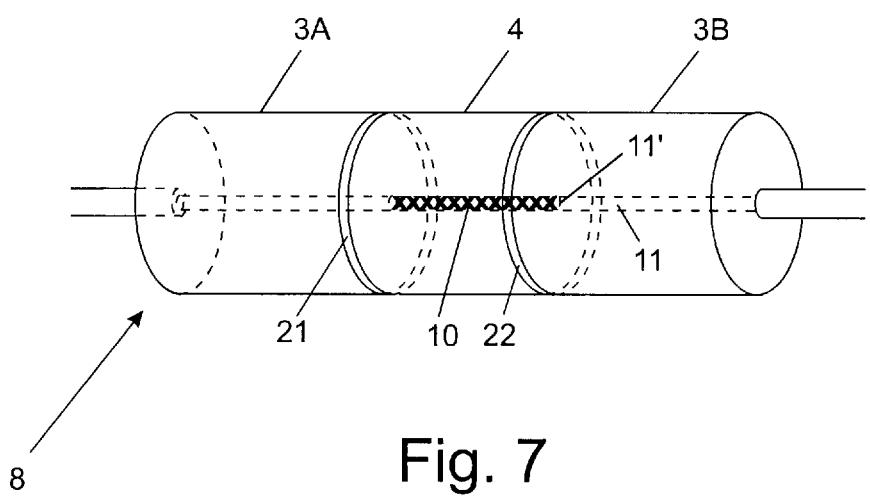
FIG. 7 shows an FFPI having an intracavity FBG positioned within the FP cavity.

The ferrule of FIG. 5B is used to construct an integrated FFPI/FBG of FIG. 7 with an integral, intracavity FBG. The fiber ferrule of FIG. 5B is substituted for ferrule 3C to form wafer 4 in the construction steps of FIGS. 4A–D. The full-length FBG of FIG. 5B is typically truncated during construction of the wafer.

Figure 6:
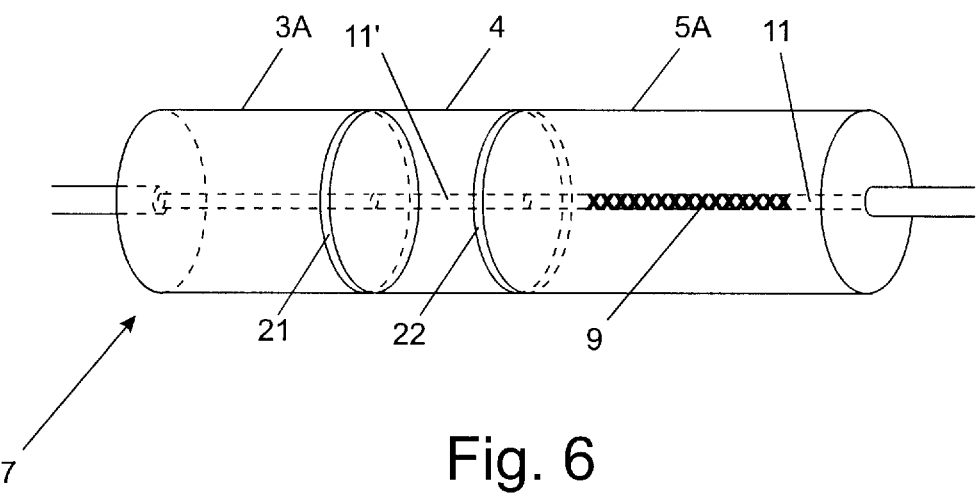
FIG. 6 shows an FFPI having an integral FBG in series with the FP cavity.

FIG. 6 is a diagram of an integrated FFPI/FBG 7 comprising the FFPI 6 as shown in FIG. 3 with ferrule 3B of FIG. 5A having a full-length FBG 9 in its axial fiber in place of ferrule 3B of FIG. 3. Integral FFPI/FBG 7 is preferably constructed by the methods described previously in FIGS. 4A–4D.

FIG. 7 is a diagram of an integrated FFPI/FBG 8 comprising the FFPI 6 as shown in FIG. 3 with a truncated FBG 10 in the bare fiber 11' of wafer 4. The FBG is an intracavity FBG. FFPI/FBG 8 is produced by the processes described for FIGS. 4A–4D by substituting ferrule 3C of FIG. 5B for ferrule 3C of FIGS. 4A–B. In this embodiment, the length of FBG 10 is constrained to be no more than the length of wafer 4. The FBG is cut when wafer 4 is formed. Although in general FBG 10 is truncated (i.e., cut shorter than a standard commercial FBG), it has an effectively greater length due to its position in the FP cavity where multiple passes of light traverse FBG 10.

Figure 8:
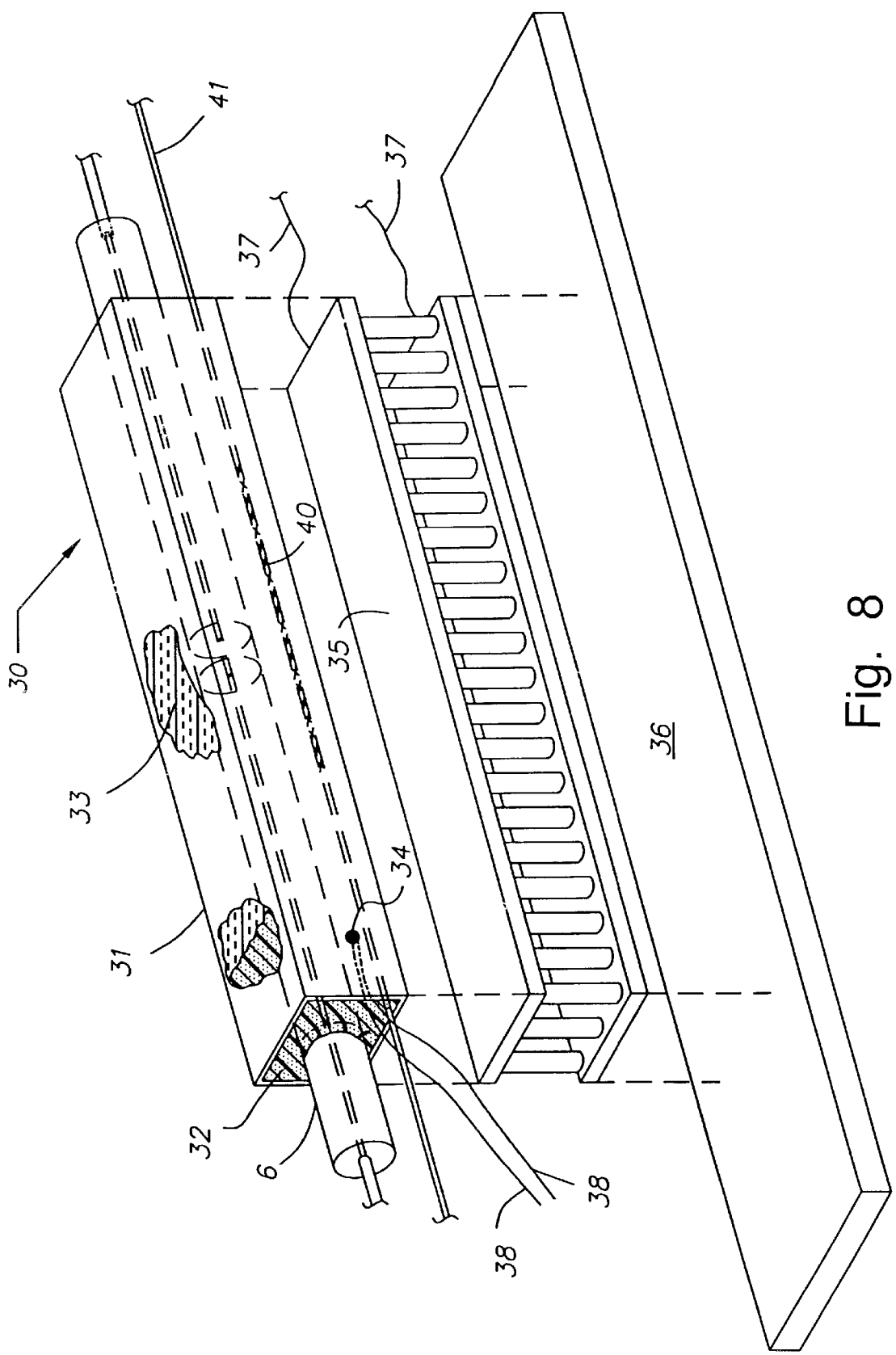
FIG. 8 shows an isothermal assembly for an exemplary FFPI and a separate FBG (i.e., external to the FFPI ferrules).

FIG. 8 is a diagram of an isothermal assembly 30 for maintaining the temperature of an FFPI and an FBG within the limits required for the desired wavelength accuracy. A heat transfer device, preferably a thermoelectric heater-cooler 35 having electrical power leads 37, is mounted on a substantially isothermal plate 36. Enclosure 31 is mounted on heater-cooler 35. FFPI 6, external FBG 40 (commercially available) and temperature sensor 34 are housed in enclosure 31, bonded to it at one end by epoxy 32, and surrounded by thermal grease 33 throughout the remaining interior of enclosure 31. FBG 40 (shown as cross-hatching) is an integral part of external FBG fiber 41. Sensor leads 38, connected to sensor 34, provide an electrical signal responsive to temperature from sensor 34 to a controller (not shown) which supplies current to heater-cooler 35 via power leads 37 to maintain the temperature of assembly 30 and sensor 34 substantially at a selected temperature.

Figure 9:
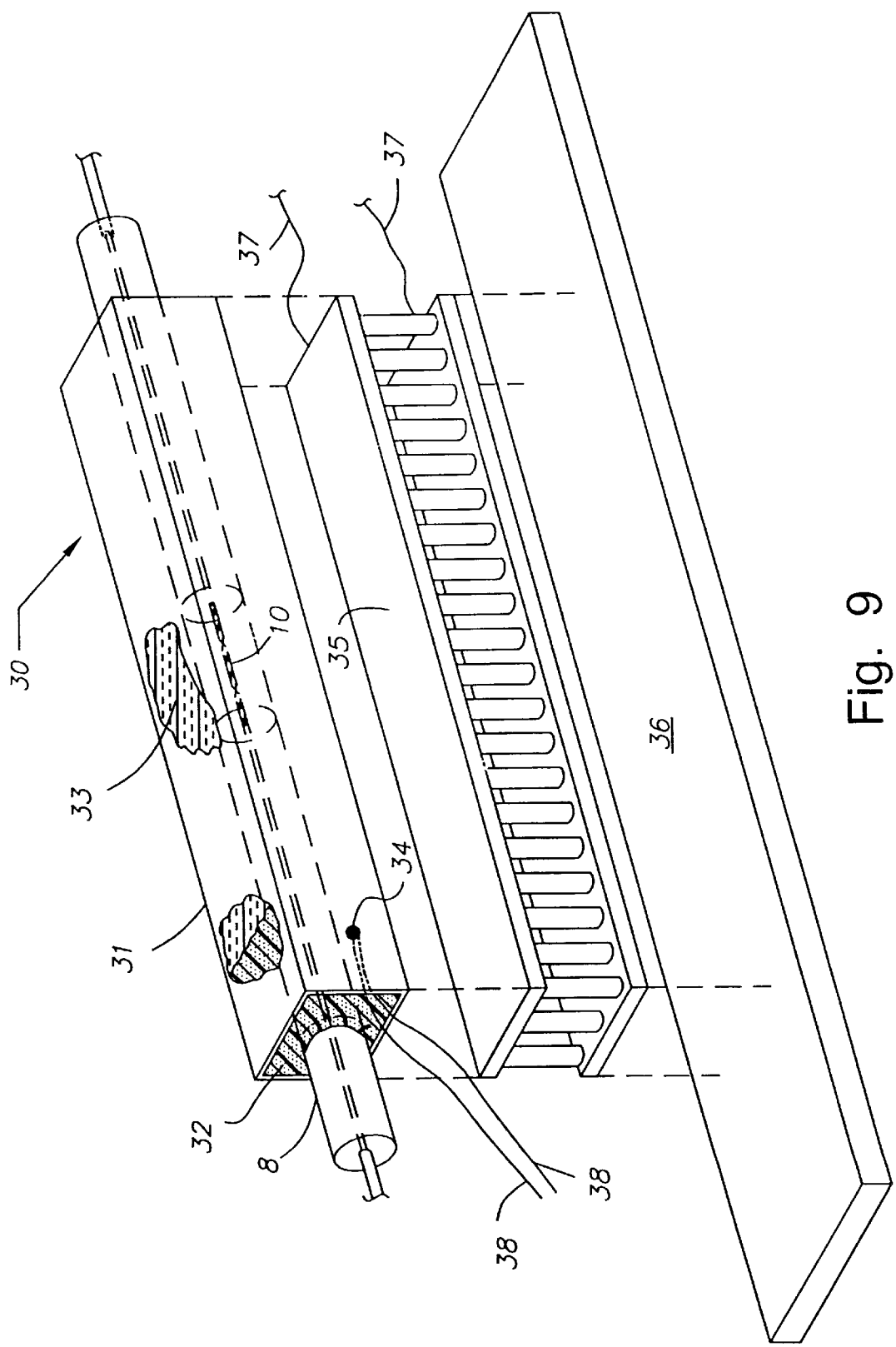
FIG. 9 shows an isothermal assembly for an FFPI with an integral FBG.

FIG. 9 is a diagram of an isothermal assembly as shown in FIG. 6 but wherein FFPI 6, FBG 40 and FBG fiber 41 have been replaced by integrated FFPI 7 which contains integral FBG 9. This isothermal assembly functions as described in FIG. 6.

Figure 10:
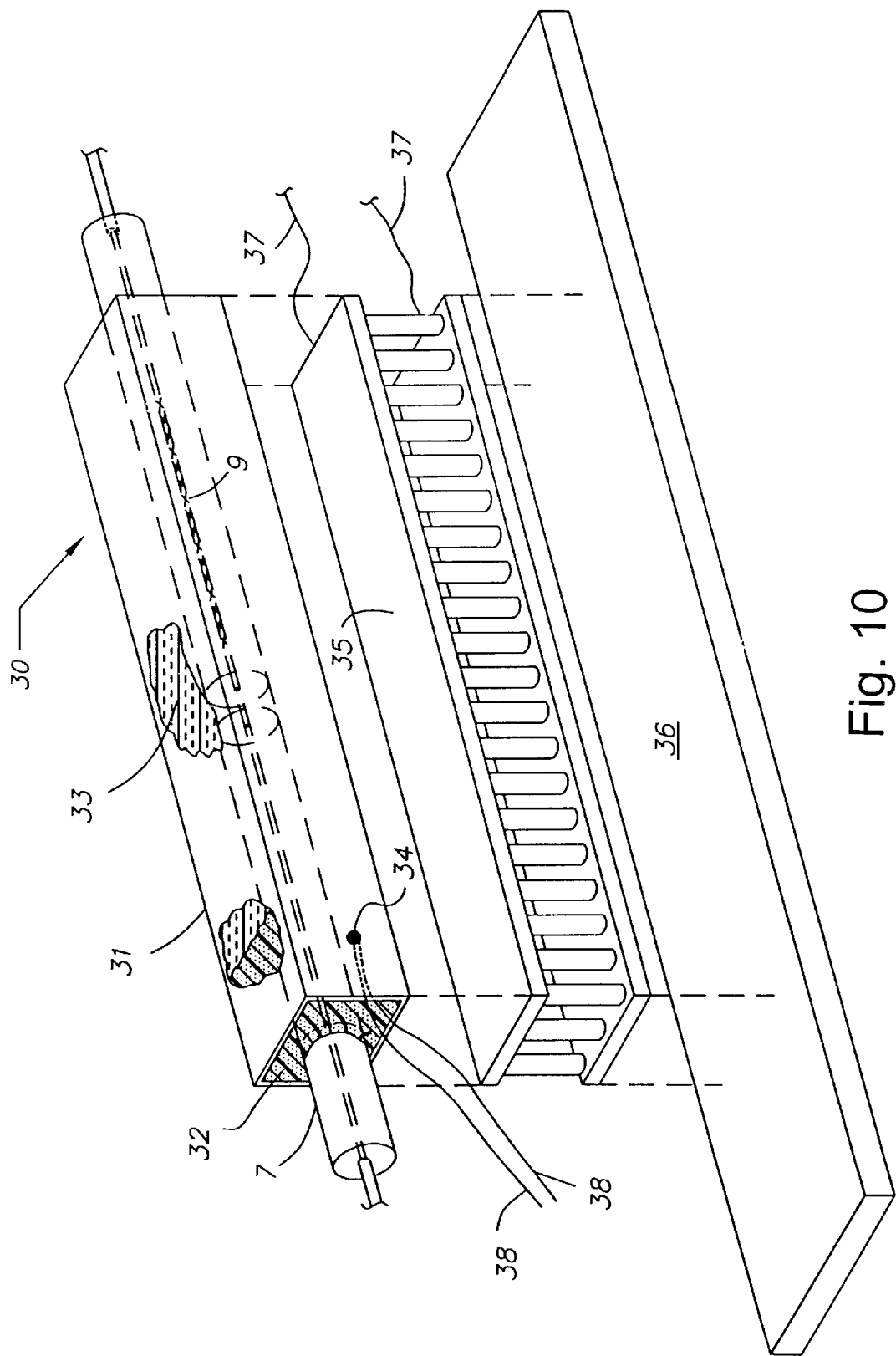
FIG. 10 shows an isothermal assembly for an FFPI with an intracavity FBG.

FIG. 10 is a diagram of an isothermal assembly as shown in FIG. 8 but wherein FFPI 6, FBG 40 and FBG fiber 41 have been replaced by integrated FFPI/FBG 8 which contains intracavity FBG 10. This isothermal assembly functions as described in FIG. 6.

In the construction of the isothermal assemblies of FIGS. 8–10 it is preferred that the body of the ferrule assembly of the FFPI and integrated FFPI/FBG (and any external FBG) does not contact the enclosure, except through the adhesive bond to the enclosure, to avoid application of mechanical forces to the elements that might detrimentally affect the temperature coefficients. In a preferred construction design the FFPI (or FFPI/FBG) is substantially centered within the enclosure (for example with appropriately sized spacers, pins or dowels) and a layer of UV-cured epoxy is introduced at one end of the enclosure to form a bond between the enclosure and one end of the ferrule assembly. A thermal sensor is optional positioned in the enclosure close to the FFPI or FFPI/FBG and bonded in position employing the same layer of adhesive. In a preferred isothermal assembly when an FFPI wavelength reference employs an external FBG, the fiber carrying the external FBG is introduced into the enclosure close to, but not in contact with the FFPI ferrule assembly and not in contact with the enclosure except through an adhesive bond. The external FBG and FFPI can be held in position with respect to each other, the enclosure, and any optional thermal sensor with a single adhesive layer.

The external FBG fiber 41 comprises a coated optical fiber (the fiber is recoated after the gratings are formed). To improve thermal conduction in the assembly, the standard coating of the FBG fiber can be replaced with a thin thermally conductive coating layer, for example a polyimide coating.

The enclosure cavity of the assemblies of FIGS. 8, 9 and 10 containing the FFPI, FBG and optional temperature sensor is substantially filled with thermal grease(or alternatively another thermally conductive material). It is preferred that entrapped air within the enclosure is minimized.

Figure 11:
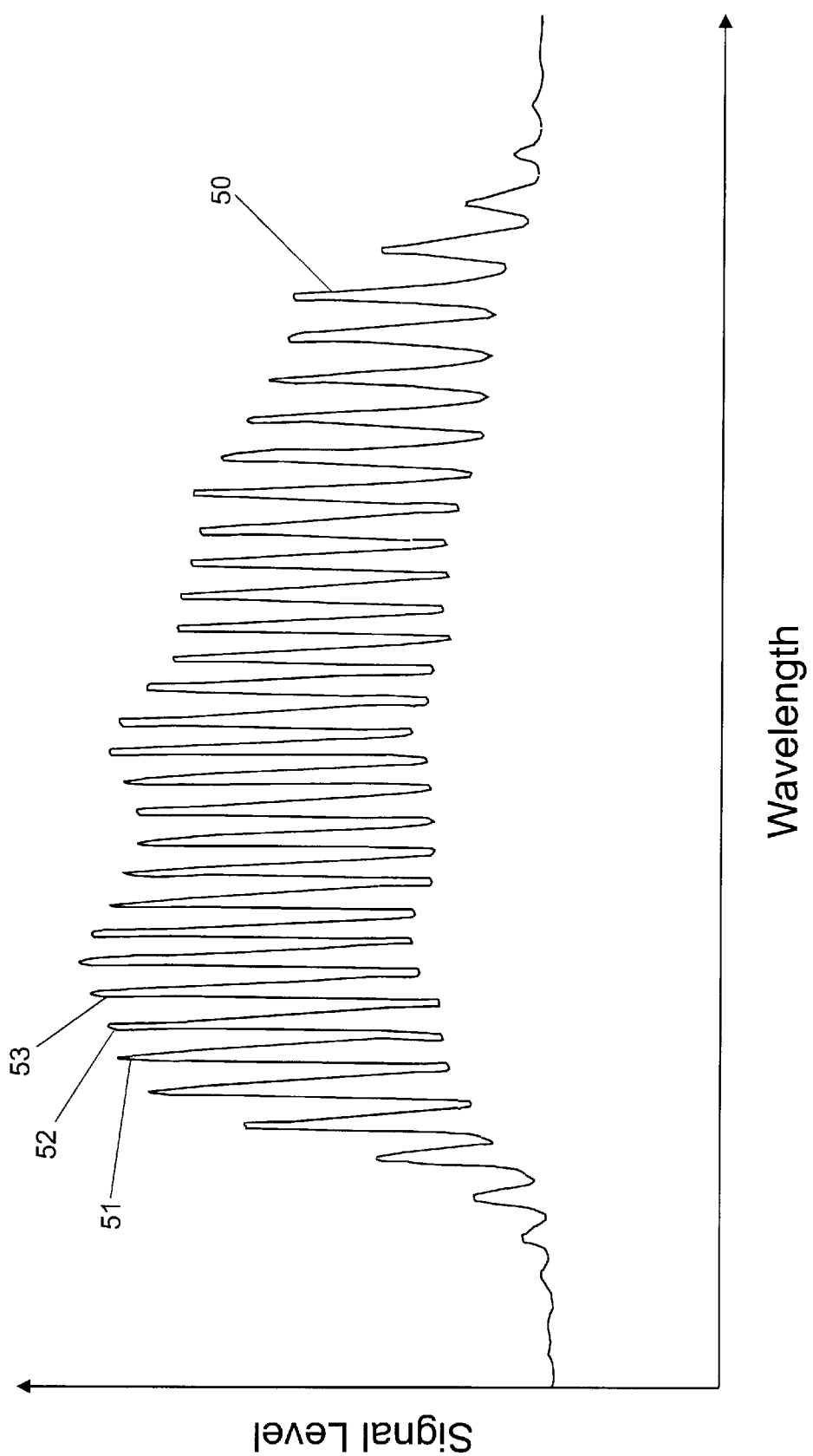
FIG. 11 is a spectral plot of a wavelength comb produced by an fixed-cavity FFPI such as illustrated in FIG. 3.

FIG. 11 is a typical spectral plot of a wavelength comb 50 of light transmission peaks produced by an FPI when illuminated by a broadband light source. A chosen reference tooth (or peak) 52 is preceded by a leading tooth 51 and followed by a trailing tooth 53. The number of teeth in comb 50 is preferably limited to a selected wavelength range of interest employing a bandpass filter connected in series with the FPI. The use of the bandpass prevent aliasing. The variations in the intensity of the comb peaks in the plot are caused by variations in the output of the light source over its spectrum.

Figure 12:
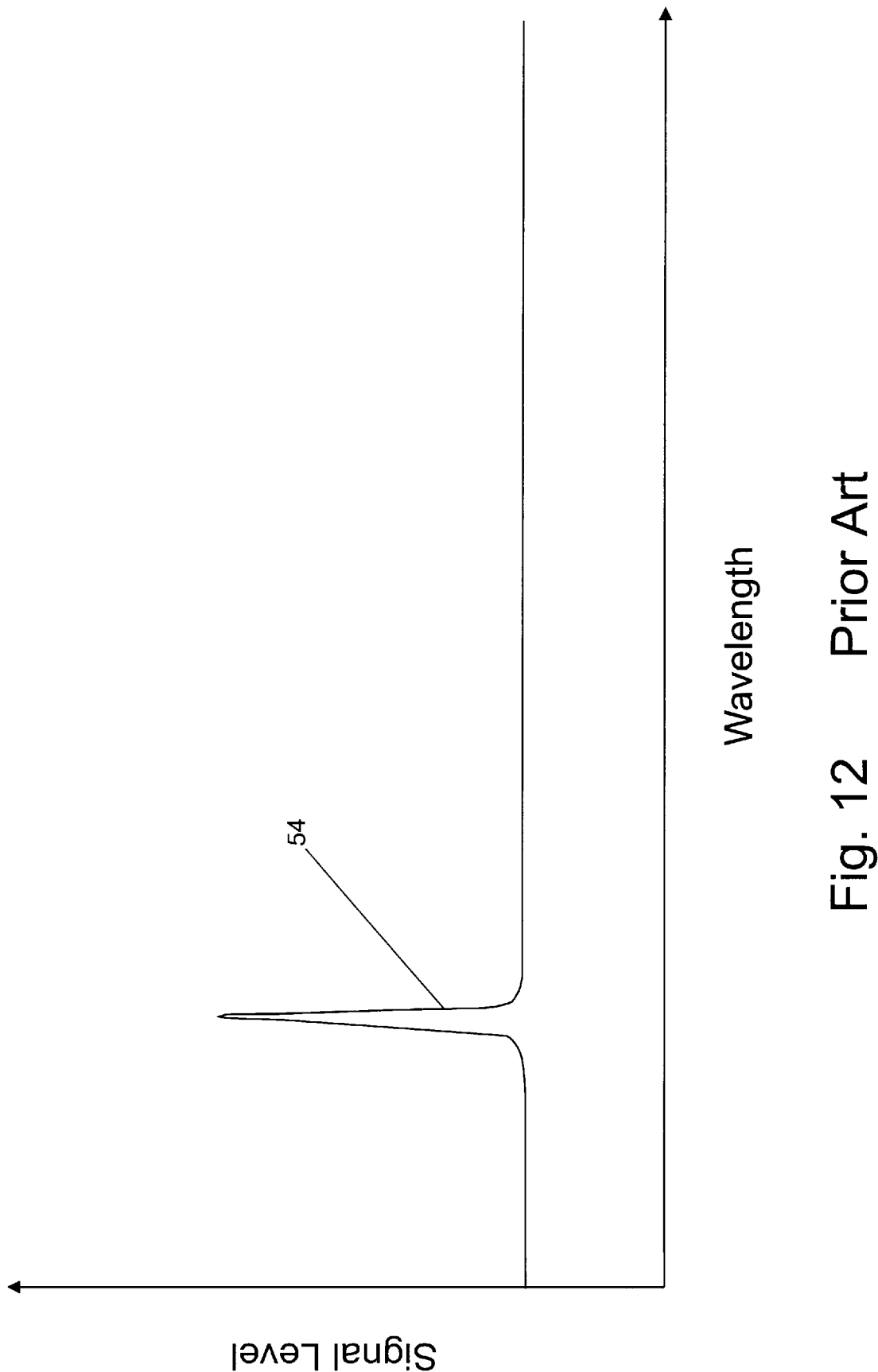
FIG. 12 is a spectral plot of a wavelength peak reflected from an FBG.

FIG. 12 is a typical spectral plot showing a peak 54 in the wavelengths of light reflected by an FBG when illuminated by a broadband light source.

Figure 13:
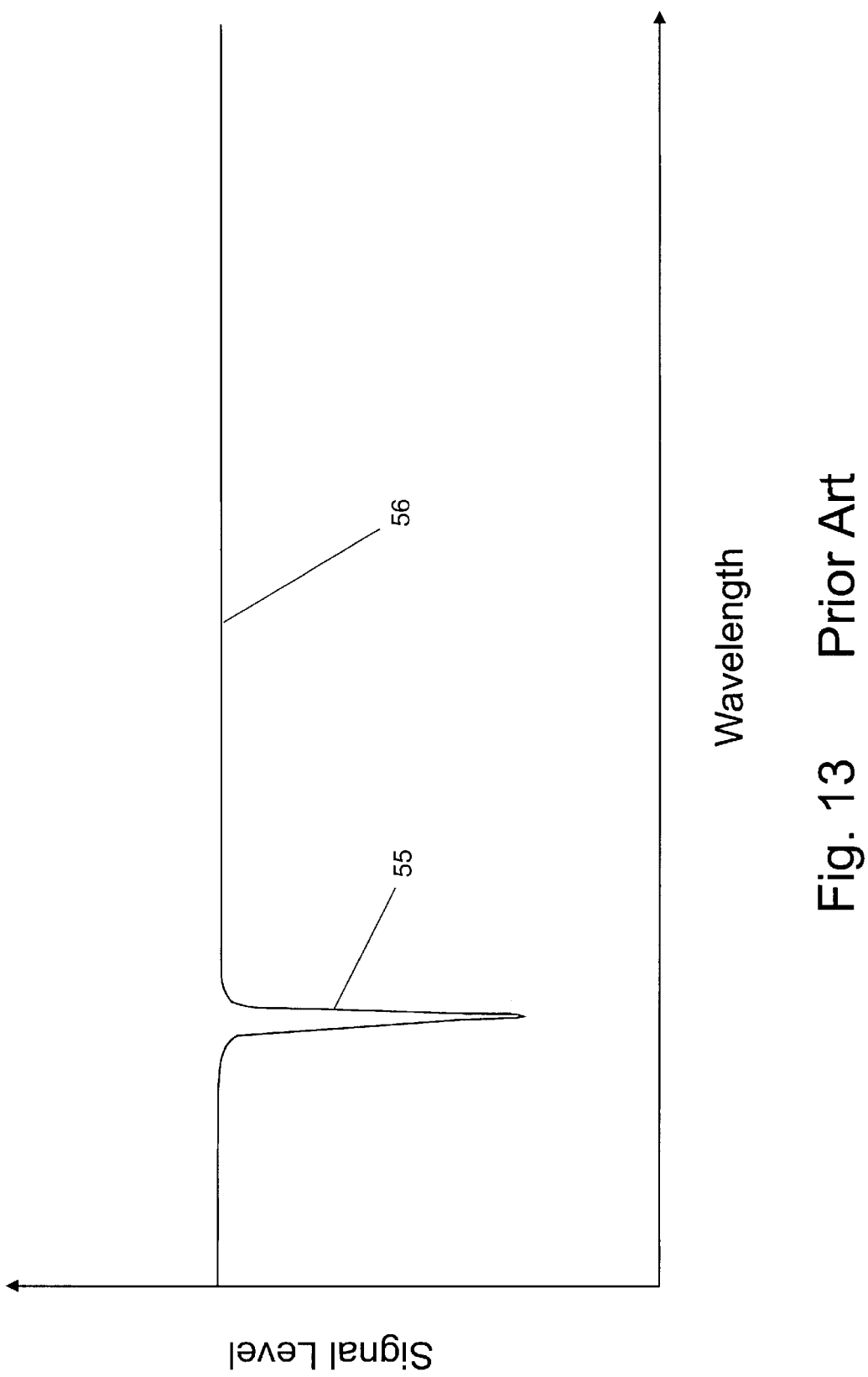
FIG. 13 is a spectral plot of a transmitted wavelength notch of an FBG.

FIG. 13 is a typical spectral plot showing a notch 55 in broadband light wavelengths 56 transmitted by an FBG when illuminated by a broadband light source.

Figure 14:
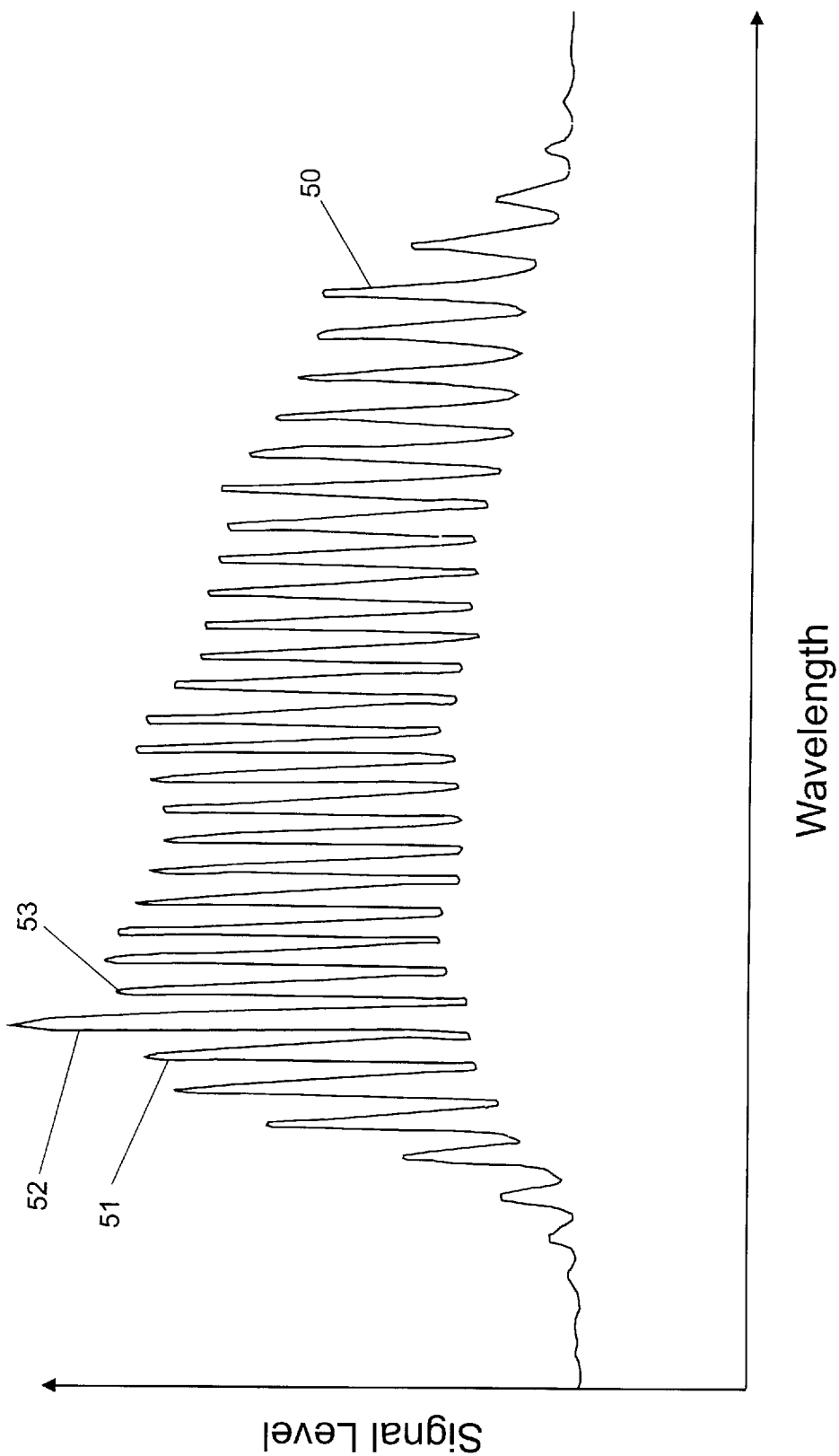
FIG. 14 is a spectral plot of a marked wavelength comb of an exemplary multi-wavelength reference of this invention having a ferrule-based FFPI with an external FBG in parallel configuration (See FIG. 15). The FBG wavelength substantially coincides with a wavelength generated by the FFPI and on superposition of the output of the FFPI and the FBG the intensity of a comb peak is enhanced.

FIG. 14 is a typical spectral plot produced by a parallel combination of an FPI and an FBG. In this plot, wavelength comb 50 has a reflection peak 54 as shown in FIG. 12 superimposed on reference tooth 52. The effect of the FBG is to enhance the intensity of reference tooth 52 relative to leading tooth 51 and trailing tooth 53, and thereby identify (or mark) tooth 52 as the reference tooth. The wavelength marker in FIGS. 14 indicates one possible position for a calibrated wavelength reference base, from which all other comb wavelengths can be calculated.

Figure 15:
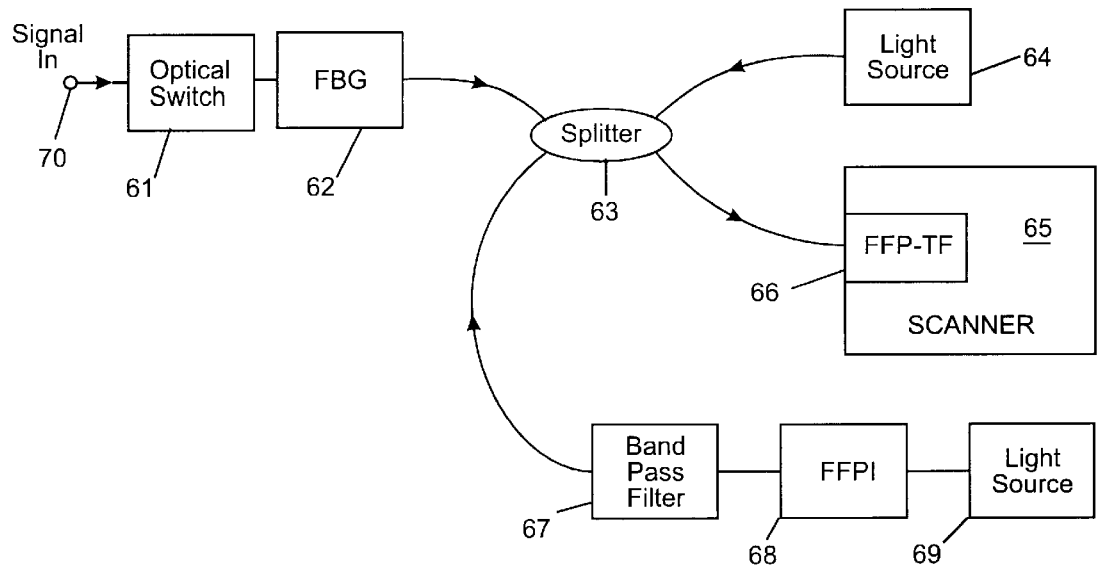
FIG. 15 is a schematic diagram of a multi-wavelength meter having an FFPI of FIG. 3 and an FBG in parallel.

FIG. 15 is a block diagram showing optical coupling of elements of an exemplary multi-wavelength measurement system utilizing a parallel combination of a fixed FPI and an FBG as a wavelength reference. Arrows indicate direction of light through elements where appropriate. The system comprises optical switch 61, FBG 62, optical spitter 63, FBG light source 64, scanner 65 comprising a tunable FFP filter 66, bandpass filter 67, fixed FPI 68 and FPI light source 69. To measure the wavelength of an optical signal (signal in 70), light sources 64 and 69 are turned off and the signal is introduced through switch 61, FBG 62, and spitter 63 to tunable filter 66. Scanner 65 applies a control signal to tunable filter 66, causing it to scan across the wavelength spectrum of interest, and relates the wavelengths of the signal passing through filter 66 to the control signal. To utilize the reference, switch 61 is turned off and light sources 64 and 69 are turned on. Light from source 64 passes through spitter 63 and light at the Bragg wavelength of FBG 62 is reflected back through spitter 63 into filter 66. Light from source 69 is applied to FPI 68 and a comb of wavelengths, passed by filter 68, passes through bandpass filter 67 and spitter 63 to filter 66. The reference wavelengths from FBG 62 and FFPI 68 are scanned and also related to the control signal. Since the signal wavelengths and the reference wavelengths are both related to the same control signal, the signal wavelengths can be measured by relating them to the reference signals.

Figure 16:
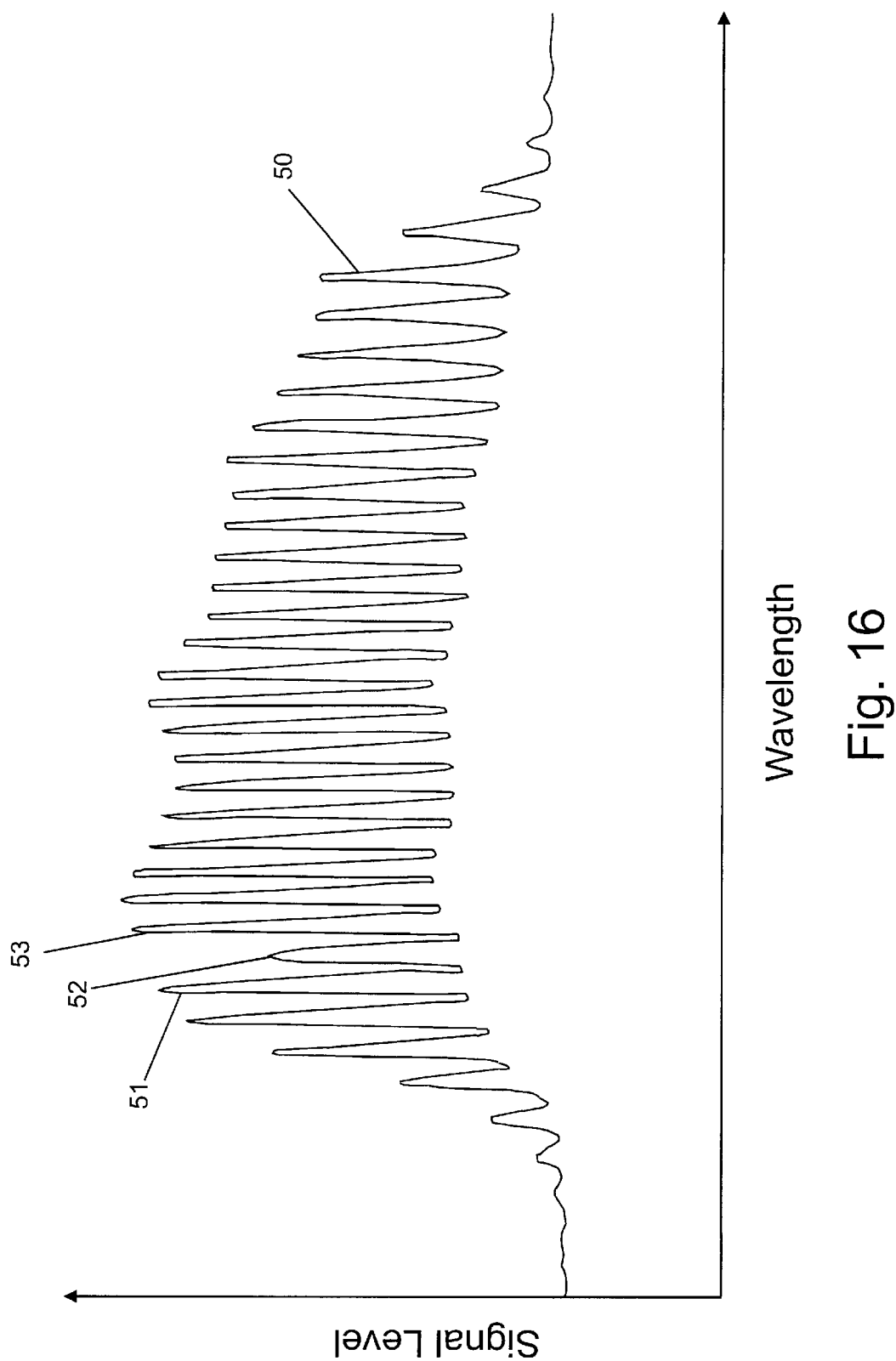
FIG. 16 is a spectral plot of a marked wavelength comb of an exemplary multi-wavelength reference of this invention having a ferrule-based FFPI with an external FBG in series configuration (See FIG. 17). The FBG wavelength substantially coincides with a wavelength generated by the FFPI and on superposition of the output of the FFPI and the FBG the intensity of a comb peak is decreased.

FIG. 16 is a typical spectral plot of a wavelength comb 50 produced by an FPI when connected in series with an FBG. The FBG superimposes a transmission notch 55 as shown in FIG. 13 on reference tooth 52. The effect of the FBG is to attenuate the intensity of reference tooth 52 relative to leading tooth 51 and trailing tooth 53 and thereby identify tooth 52 as the reference tooth. The wavelength marker illustrated in this figure is one possible position for a calibrated wavelength reference base, from which all other comb wavelengths can be calculated.

Figure 17:
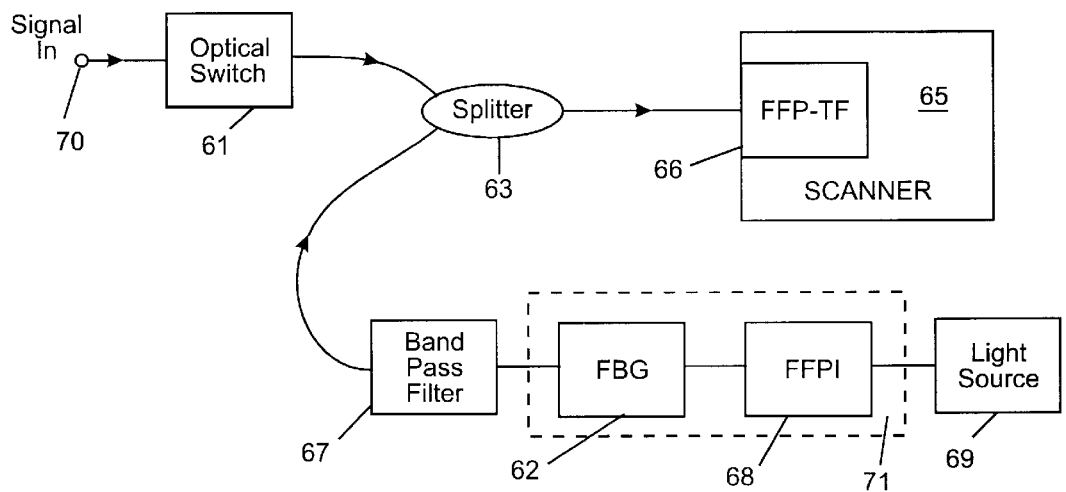
FIG. 17 is a schematic diagram of a multi-wavelength meter having an FFPI of FIG. 3 and an FBG in series configuration.

FIG. 17 is a block diagram of an exemplary multi-wavelength measurement system utilizing a series combination of a fixed FPI and an FBG as a wavelength reference. The system comprises optical switch 61, optical spitter 63, scanner 65 containing FFP tunable filter 66, bandpass filter 67, series combination of fixed FFPI 68 and FBG 62, and FFPI light source 69. To measure the wavelength of an optical signal, light source 69 is turned off and the signal is applied through switch 61 and spitter 63 to tunable filter 66. Scanner 65 applies a control signal to tunable filter 66, causing it to scan across the wavelength spectrum of interest, and relates the wavelengths of the signal passing through filter 66 to the control signal. To utilize the reference, switch 61 is turned off and light source 69 is turned on. Light from source 69 is introduced through FPI 68 and FBG 62. A comb of wavelengths from FFPI 68, one of which is attenuated by FBG 62, passes through bandpass filter 67 and spitter 63 to filter 66. Then, as previously described for FIG. 16, the reference wavelengths are scanned and related to the control signal. The separate FBG 62 and FFPI 68 elements in series in the system of FIG. 17 can be substituted with an integrated FFPI/FBG (FIG. 6 or 7).

The bandpass filter 67 in series with the interferometer in system configurations of FIGS. 15 and 17 defines a wavemeter scan region. The bandpass filter is useful in wavelength measuring systems to prevent spectral aliasing by the tunable FFP 66.

The parallel configuration of FIG. 15 allows alternate detecting of the FBG reflection and comb peaks without any additional processing software; but this configuration employs two light sources as well as the dedication of one instrument channel for the FBG reference. On the other hand, by concatenating the FBG and FFPI in series in one reference arm, as in FIG. 17, the comb spectrum can be uniquely identified with the aid of FBG transmission notch, and the system employs only one light source leaving all channels available for measurements.

The wavelength measurement systems of FIGS. 15 and 17 are illustrated with a tunable-FFPI (FFP-TF)in the wavelength scanner. More generally a variety of tunable interferometers can be used in such systems. Most applications require relatively high finesse tunable interferometers, preferably with finesse greater than about 100. Tunable Mach-Zender, Sangac, Michaelson and acousto-optic tunable interferometers, among others can be used in the wavelength scanner.

An FFPI can provide a wavelength comb spaced by its free spectral range (FSR$_f$) from 0.1 to 10 nm apart. Within a $\Delta\lambda$=50 nm ($\Delta u$=6250 GHz) scanner spectrum there can typically be 5 to 500 reference peaks with almost identical spacing. With regard to FSR$_f$ uniformity due to chromatic dispersion, the change in FSR$_f$ as a function of wavelength from the initial FSR$_{fo}$ is $$\delta FSR_f = \frac{\delta n(\lambda)}{n(\lambda)} FSR_{fo}$$

where $\delta n(\lambda)$ is the change in refractive index from initial wavelength, while $n(\lambda)$ is the fiber's refractive index. Considering the fiber's total refractive index change over $\Delta\lambda$=50 nm in the 1550 nm wavelength region to be $\delta n$~0.0007, then the maximum FSR$_f$ variation ($\Delta$FSR$_f$) due to chromatic dispersion is $$\Delta FSR_f \sim \frac{\delta n}{n_a} FSR_{fo} \sim 4.8 \times 10^{-4}(FSR_{fo})$$

where $n_a$~1.465 is the initial refractive index. Based on typical FSR$_{fo}$ design values of 100 to 250 FHz, $\Delta$FSR$_f$ is <1 pm. If each comb peak wavelength is calculated as a multiple of FSR$_{fo}$ from the initial wavelength reference, there is then a maximum accumulated frequency error of, $$\delta f_m = \sum_{m=0}^{N} \delta FSR_f = \left(\frac{N-1}{2}\right) \Delta FSR_f$$

where N is the total number of comb peaks. For an FSR$_{fo}$= 100 GHz, and N=63, $\delta f_m$~1.488 GHz ($\delta\lambda_m$~12 pm) simply due to minute dispersive nonuniformity in the comb spectrum. On the other hand, in practice, the comb array is calculated from the average FSR$_f$, then the frequency error $\Delta f_m$ of the m-th actual reference peak becomes $$\Delta f_m = \left(\frac{m(N-m)}{2}\right)\left(\frac{\delta n}{n_0 \Delta v}\right) FSR_{fo}^2$$

where the maximum error occurs at m=N/2, resulting in a maximum $\Delta f_m$~0.367 GHz, or equivalent to ~3 pm in wavelength. These errors could also be corrected because they can be accurately calculated using the above formula.

The thermal stability of FSR$_f$ of a ferrule-based all-fiber FFPI has been measured to be ~0.0062 pm/FSR/°C., which was deduced from measurements of accumulated FSR$_f$ of 14 pm over ~35.8 nm wavelength span over 0°–50° C. The FFPI resonance stability has been measured to be ~13 pm/°C. In the specific embodiments in FIGS. 8–10, both the FBG and FFPI are stabilized by thermoelectric control, which should easily attain 1.3 pm stability. Because FFPI characteristics vary linearly with temperature, and the FBG can be mounted to match FFPI's thermal dependence such that there is negligible relative spectral shift, one may also calibrate the wavelength reference characteristics over an intended operating temperature range, thereby eliminating the need for thermoelectric control.

For references like those in FIGS. 8–10, wavelength calibration is performed by inputting a tunable laser source into the multi-channel wavelength meter (FIGS. 15 and 17), and simultaneously monitored by a Burleigh wavemeter WA-1500 of 0.1 pm absolute accuracy. Due to high level of spacing uniformity, only two parameters are necessary to completely characterize the reference: (1) the average FSR, and (2) one known wavelength, in this case selected to be the next higher FFPI passband wavelength after the reference FBG as shown by the wavelength markers in FIGS. 14 and 16. By applying two wavelengths, spaced apart near the extremes of the wavelength range, one can achieve an accurate average $FSR_f$ calibration. Subsequent application of polynomial curve-fitting completes the multi-wavelength meter calibration. This approach provides a versatile adaptive real-time calibration capability. Small systematic thermal variations amounting to less than ±2 pm have been measured in systems like those of FIGS. 15 and 17 employing ferrule-based FFPIs from 1520 to 1570 nm over the temperature range 10° C.–55° C. These errors containing the sum of chromatic, thermal and all other errors are systematic and repeatable and can also be readily corrected by use of empirical formula.

By employing a multi-wavelength reference consisting of an FBG and FFPI (ferrule-based), in combination with a high-performance FFP-TF, an accurate multi-channel wavelength meter with a minimum channel spacing of 0.6 nm has been demonstrated. The wavelength meter is capable of sub-pm resolution and a calibrated wavelength accuracy of ±5 pm over a 10°–55° C. operating temperature range.

The multiple-wavelength reference of this invention incorporates an FBG and an interferometer arranged either in parallel or series as illustrated in FIGS. 15 and 17, where the spectra output of the reference configurations are shown in FIGS. 14 and 16, respectively. While these configurations have been illustrated with FFPIs, other interferometers, in both single-pass and multipass configurations, for example, Mach-Zender, Sagnac and Michaelson interferometers can be readily adapted for use in the wavelength references of this invention. Preferred interferometers are fiber-based filters that can be readily integrated into fiber optic systems.

Preferred FFPIs of the wavelength reference of this invention are lensless all-fiber based devices with FP cavities formed in optically continuous fiber. They provide uniformly-spaced periodic transmission peaks (comb peaks), but in comparison to bulk FPIs, are robust for field applications. FFPIs constructed in ferrule assemblies are specifically described herein and are preferred. However, all-fiber FFPIs can be constructed using fiber fusion techniques, for example reflective taps (mirrors) can be introduced with selected spacing into optical continuous fiber to form FP cavities by several techniques. Electrical arc and/or thermal fusion methods can be used to form FP cavities, for example by fusing a bare fiber mirror to another fiber, then cleaving the mirrored-fiber end to a desired cavity length and finally by fusing the cleaved fiber end to a second mirror to form the cavity. See, for example, U.S. Pat. Nos. 4,848,999, 4,892,388 and 4,923,273 for fusion techniques. Epoxy-bonded FFP can be formed in an analogous series of steps, in which fiber fusion is replaced with direct bonding of fibers and mirrored fibers using adhesive layers (preferably UV-cured epoxy). In either case, known fiber alignment techniques (e.g., alignment of fibers in V-grooves) can be used during fusion or bonding. FFPIs constructed in fibers without ferrule can be stabilized (against fiber damage and breakage) by appropriate packaging techniques. Methods of temperature compensation, thermal sensing and thermal control, analogous to those illustrated herein and as known in the art, can be applied to fiber FFPIs.

FPIs of this invention include lensed FP interferometers employing, for example, regular lenses, GRIN (gradient index) lenses or aspheric lenses, among others. These configurations consist of optical fibers coupled to lenses which expand and collimate light from the fiber into free-space or solid FP cavities and direct the filter output back into a fiber. A number of lensed FP filters are commercially available.

By integrating an FBG into the ferrule assembly of an FFPI, both the temperature coefficients and the operating temperatures of the FFPI and the FBG are made very nearly the same, and as a result the wavelengths of the two devices track over a wide range of temperatures. Further, the ferrule assembly is bonded into a single integrated unit which is compact and robust. Typically, the wavelength temperature coefficient of an FFPI is about 13 picometers/°C. For higher precision applications, the integrated FFPI/FBG ferrule assembly can be housed in a thermally conductive enclosure along with a temperature sensor. Then, either the enclosure can be held at a specific temperature by a heat transfer device coupled through a controller to the temperature sensor, or the temperature sensor signal can be used to compute a wavelength correction factor as a function of temperature. Because of the high power requirements of heat transfer devices, the correction factor system is more practical for portable or battery operated references.

A variety of active and passive methods for temperature compensation of interferometers (particularly FFPIs) and FBG are known in the art. These methods can be employed to temperature compensate the elements of the multi-wavelength references of this invention.

The multi-wavelength references of this invention can also be used in all of the wavelength measurement and sensor interrogation system configurations described in copending U.S. patent application Ser. No. 08/833,622. However, the FFPIs with integrated FBGs are limited to series configurations.

All references cited herein are incorporated by reference in their entirely herein. Those of ordinary skill in the art will appreciate that routine variations, modifications and adaptations of the various methods, procedures, techniques, and device configurations specifically disclosed herein can be readily made without departing from the spirit and scope of this invention.

We claim:

1. A multi-wavelength reference which comprises:
   an interferometer which provides a spectral output that is a comb of peaks spanning a wavelength range; and
   a fiber Bragg grating (FBG) which provides spectral output at a selected wavelength within said wavelength range, wherein the spectral output of said FBG marks a peak of said comb identifying its wavelength.

2. The multi-wavelength reference of claim 1 wherein the FBG is optically coupled in series with said interferometer and the output of the coupled FBG and interferometer is a comb of peaks with one of the peaks therein marked.

3. The multiwave reference of claim 1 wherein the FBG is optically coupled in parallel with said interferometer and the output of the coupled FBG and interferometer is a comb of peaks with one of the peaks therein marked.

4. The multi-wavelength reference of claim 1, further comprising:

a light source coupled to said FBG and to said interferometer;

an optical splitter coupled to said FBG and to said interferometer, wherein said splitter combines the spectral output of said FBG and said interferometer.

5. The multi-wavelength reference of claim 1 further comprising a bandpass filter optically coupled in series with said interferometer.

6. The multi-wavelength reference of claim 1 wherein said interferometer is a Fabry-Perot interferometer.

7. The multi-wavelength reference of claim 6 wherein said interferometer is a fiber Fabry-Perot interferometer.

8. The multi-wavelength reference of claim 7 wherein said fiber Fabry-Perot interferometer comprises:

first and second ferrules, each ferrule having a portion of an optical fiber extending into a bore through said ferrule and having an end face at an end of said fiber;

a wafer having an optical fiber in a wafer bore through said wafer and having first and second wafer faces, one of said wafer faces located at each end of said wafer fiber, and each of said wafer faces bonded to one of said ferrule end faces;

a mirror at each end of said wafer fiber, said mirrors defining a Fabry-Perot resonance cavity; and wherein the fibers in said interferometer are aligned to provide an optical path through said ferrules and said wafer.

9. A multi-wavelength reference as in claim 8 wherein the fiber in the optical path of said interferometer contains a fiber Bragg grating.

10. A multi-wavelength reference as in claim 9 wherein said fiber Bragg grating is within the fiber of one of said first and second ferrules.

11. A multi-wavelength reference as in claim 10 wherein said fiber Bragg grating is within the fiber of said wafer.

12. A multi-wavelength reference of claim 1 further comprising a thermally conductive assembly wherein said interferometer and said FBG are thermally coupled to said assembly.

13. A multi-wavelength reference of claim 12 further comprising a temperature sensor thermally coupled to said assembly.

14. A multi-wavelength reference as in claim 12 wherein said assembly comprises an thermally conductive enclosure surrounding said interferometer and said FBG.

15. A multi-wavelength reference as in claim 14 further comprising a temperature sensor within said enclosure.

16. A multi-wavelength reference as in claim 15 wherein said enclosure contains thermal grease.

17. A multi-wavelength reference as in claim 12 wherein said interferometer is a ferrule-based FFPI.

18. A multi-wavelength reference as in claim 17 wherein said ferrule-based FFPI contains an FBG integrated in the fiber of its optical path.

19. A multi-wavelength reference as in claim 12 further comprising heat transfer means thermally coupled between said assembly and a substantially isothermal mass.

20. A multi-wavelength reference as in claim 19 wherein said heat transfer means comprises a thermoelectric heater-cooler.

* * * * *

UNITED STATES PATENT AND TRADEMARK OFFICE
CERTIFICATE OF CORRECTION

PATENT NO. : 5,892,582
DATED : April 6, 1999
INVENTOR(S) : Bao et al.

It is certified that error appears in the above-identified patent and that said Letters Patent is hereby corrected as shown below:

On the title page, under Related U.S. Application Data, please replace "60/012,517" with --60/028,517--.

On the title page, above [60], insert the following:
[63] Continuation-in-part of application no. 08/833,602. Apr. 9, 1997, Pat. No. 5,838,437

On page 2, Column 1,
Line 3, please replace "10 GHz" with --100 GHz--.
Line 10, please replace "fber" with --fiber--.
Line 19, please replace "ssampled" with --sampled--.
Last Line please replace "reference" with --referencing--

On page 2, Column 2,
Line 6, please replace "for" with --of--.
Last Line please replace "sale" with --scale--.
Last Line please replace "68596861" with --6859-6861--.

Column 1,
Line 9, please insert at the end of the line --under 35 U.S.C. § 120 to--.
Line 11, please insert --now U.S. Patent No. 5,838,437 -- after "1997,"
Line 20, please replace "(FFPIs)" with --(FFPI)--.
Line 21, please replace "and" with --an--.

Column 2,
Line 46, please replace "application," with --applications,--.

Column 3,
Line 2, please replace "5,361,30" with --5,361,130--.
Line 21, please replace " "spatial/wavelengthdivision" with --spatial/wavelength-division--.
Line 25, please replace "sensor," with --sensors,--.

Column 5,
Line 39, please "is a" with --is an--.

UNITED STATES PATENT AND TRADEMARK OFFICE
CERTIFICATE OF CORRECTION

PATENT NO. : 5,892,582
DATED : April 6, 1999
INVENTOR(S) : Bao et al.

It is certified that error appears in the above-identified patent and that said Letters Patent is hereby corrected as shown below:

Column 6,
Line 4, please replace "cavity In" with --cavity. In--.

Column 7,
Line 55, please replace "an bare" with --a bare--.

Column 8,
Line 53, please replace "5,062,68;" with --5,02,684;--.

Column 10,
Line 46, please replace "bandpass prevent" with --bandpass filter prevents--

Column 11,
Lines 4,9,16,17,20,39,44, and 52, each occasion, please replace "spitter" with --splitter--.

Column 12,
Line 36, please replace "FHz," with --GHz--.

Column 13,
Line 14, please replace "passband" with --bandpass--.

UNITED STATES PATENT AND TRADEMARK OFFICE
CERTIFICATE OF CORRECTION

PATENT NO. : 5,892,582
DATED : April 6, 1999
INVENTOR(S) : Bao et al.

It is certified that error appears in the above-identified patent and that said Letters Patent is hereby corrected as shown below:

Column 14,
Line 3, please replace "ferrule" with --ferrules--.
Line 40, please replace "08/833,622" with --08/833,602--.

Claim 3,
Line 1, please replace "multiwave" with --multi-wavelength--.

Claim 14,
Line 2, please replace "an" with --a--.

Signed and Sealed this

Third Day of July, 2001

*Attest:*

*Attesting Officer*

NICHOLAS P. GODICI
*Acting Director of the United States Patent and Trademark Office*